US012522508B2

(12) United States Patent
Bacher et al.

(10) Patent No.: US 12,522,508 B2
(45) Date of Patent: Jan. 13, 2026

(54) SUSTAINABLE SILICATES AND METHODS FOR THEIR EXTRACTION

(71) Applicant: Pörner Ingenieurgesellschaft m.b.H., Grimma (DE)

(72) Inventors: Gerhard Bacher, Wels (AT); Holger Henze, Grimma (DE); Dirk Fliegner, Grimma (DE); Christoph Manitz, Leipzig (DE); Sebastian Grahl, Wehlen (DE); William H. Mullee, Ellensburg, WA (US)

(73) Assignee: Pörner Ingenieurgesellschaft m.b.H., Grimma (DE)

( * ) Notice: Subject to any disclaimer, the term of this patent is extended or adjusted under 35 U.S.C. 154(b) by 0 days.

(21) Appl. No.: 18/529,125

(22) Filed: Dec. 5, 2023

(65) Prior Publication Data

US 2024/0116766 A1 Apr. 11, 2024

Related U.S. Application Data

(63) Continuation of application No. 16/969,180, filed as application No. PCT/US2019/018340 on Feb. 15, 2019, now Pat. No. 11,873,218.

(60) Provisional application No. 62/637,848, filed on Mar. 2, 2018.

(51) Int. Cl.

| | |
|---|---|
| ***C01B 33/32*** | (2006.01) |
| ***B01D 1/00*** | (2006.01) |
| ***B01J 16/00*** | (2006.01) |
| ***B01L 1/00*** | (2006.01) |

(52) U.S. Cl.
CPC ................ *C01B 33/32* (2013.01); *B01D 1/00* (2013.01); *B01J 16/00* (2013.01); *B01L 1/00* (2013.01); *C01P 2006/80* (2013.01)

(58) Field of Classification Search
CPC . C01B 33/32; B01D 1/00; B01J 16/00; B01L 1/00
See application file for complete search history.

(56) References Cited

U.S. PATENT DOCUMENTS

| | | | |
|---|---|---|---|
| 3,951,907 | A | 4/1976 | Mehta |
| 4,555,448 | A | 11/1985 | Durham |
| 4,645,605 | A | 2/1987 | Durham |

(Continued)

FOREIGN PATENT DOCUMENTS

| | | |
|---|---|---|
| EP | 3156368 | 4/2017 |
| EP | 3759049 B1 | 6/2022 |

(Continued)

OTHER PUBLICATIONS

NPL7-Bakar et al., "Production of High Purity Amorphous Silica from Rice Husk," Procedia Chemistry 19 ( 2016 ) 189-195, Aug. 4-6, 2015.

(Continued)

*Primary Examiner* — James A Fiorito
(74) *Attorney, Agent, or Firm* — Tarolli, Sundheim, Covell & Tummino LLP

(57) ABSTRACT

Liquid silicate products derived from processed organic plant matter (112), such as rice hulls, have improved purity and properties for use in the production of higher purity amorphous silica compositions (180). The liquid silicate can be optically clear, can have a controlled ratio of silica to metal earth oxide components, and can have lower concentrations of undesirable contaminants such as aluminum, chloride, iron, sulfate, and titanium.

20 Claims, 5 Drawing Sheets

(56) References Cited

U.S. PATENT DOCUMENTS

| | | | |
|---|---|---|---|
| 4,707,176 | A | 11/1987 | Durham |
| 4,885,149 | A | 12/1989 | De Freitas et al. |
| 5,165,905 | A | 11/1992 | Sasaki et al. |
| 5,714,000 | A | 2/1998 | Wellen et al. |
| 5,833,940 | A | 11/1998 | Rieber et al. |
| 5,858,911 | A | 1/1999 | Wellen et al. |
| 6,114,280 | A | 9/2000 | Stephens |
| 6,375,735 | B1 | 4/2002 | Stephens et al. |
| 6,406,678 | B1 | 6/2002 | Shipley |
| 6,409,817 | B1 | 6/2002 | Stephens |
| 6,442,258 | B1 | 8/2002 | Mashinsky |
| 6,524,543 | B1 | 2/2003 | Rieber et al. |
| 6,613,424 | B1 | 9/2003 | Putt et al. |
| 6,638,354 | B2 | 10/2003 | Stephens et al. |
| 7,048,034 | B2 | 5/2006 | Vandermeer et al. |
| 7,229,655 | B2 | 6/2007 | Hu et al. |
| 7,700,062 | B2 | 4/2010 | Schaefer et al. |
| 7,919,535 | B2 | 4/2011 | Persson et al. |
| 7,922,989 | B2 | 4/2011 | Amendola |
| 8,163,945 | B2 | 4/2012 | Thornhill et al. |
| 8,252,261 | B2 | 8/2012 | Jasra et al. |
| 8,329,831 | B2 | 12/2012 | Rapson |
| 8,349,072 | B2 | 1/2013 | Schumacher et al. |
| 8,353,984 | B2 | 1/2013 | Atoon et al. |
| 8,454,919 | B2 | 6/2013 | Soua et al. |
| 8,470,279 | B2 | 6/2013 | Hinman et al. |
| 8,475,758 | B2 | 7/2013 | Laine et al. |
| 8,568,683 | B2 | 10/2013 | Amendola et al. |
| 8,733,440 | B2 | 5/2014 | Roddy |
| 8,871,739 | B2 | 10/2014 | Blair et al. |
| 8,916,122 | B2 | 12/2014 | Laine et al. |
| 9,359,214 | B2 | 6/2016 | Sun et al. |
| 9,376,609 | B2 | 6/2016 | Karcher et al. |
| 9,394,200 | B2 | 7/2016 | Diaz-Loya et al. |
| 9,469,047 | B2 | 10/2016 | Evanson et al. |
| 9,505,657 | B2 | 11/2016 | Ciuperca |
| 11,027,981 | B2 | 6/2021 | Jost et al. |
| 2003/0096900 | A1 | 5/2003 | Holden |
| 2007/0276051 | A1 | 11/2007 | Halimaton |
| 2008/0286383 | A1 | 11/2008 | Nunn |
| 2009/0065435 | A1 | 3/2009 | Li et al. |
| 2010/0061910 | A1 | 3/2010 | Kondoh et al. |
| 2011/0129401 | A1 | 6/2011 | Fournier et al. |
| 2012/0041128 | A1 | 2/2012 | Kosso |
| 2015/0016895 | A1 | 1/2015 | Abdullah et al. |
| 2015/0110701 | A1 | 4/2015 | Laine et al. |
| 2016/0230383 | A1 | 8/2016 | Knies et al. |
| 2017/0240430 | A1 | 8/2017 | Poddar et al. |

FOREIGN PATENT DOCUMENTS

| | | |
|---|---|---|
| WO | 01/07364 | 2/2001 |
| WO | 01/46073 | 6/2001 |
| WO | 2004/073600 | 9/2004 |
| WO | 2008/016701 | 2/2008 |
| WO | 2010/129518 | 11/2010 |

OTHER PUBLICATIONS

NPL9-Mittal, “Silica from Ash,” Resonance, Jul. 1997.

NPL10—Souza et al., “Silica Derived from Burned Rice Hulls,” Materials Research vol. 5, No. 4, 467-474, 2002, Jul. 21, 2002.

NPL11—Chung et al., “Studying of Nano SiO2 Preparation From Rice Husk Ash by Using High Gravity Reaction Precipitation Technology,” VINATOM-AR--12-42 (Dec. 2012).

NPL1—International Search Report, ISA/EPO, May 31, 2019.

NPL2—Written Opinion, IPEA/EPO, May 15, 2020.

NPL3—Interntional Preliminary Report on Patentability, IPEA/EPO, Jun. 23, 2020.

NPL4—Foletto et al., “Conversion of Rice Hull Ash into Soluble Sodium Silicate,” Materials Research, vol. 9, No. 3, 335-338, Jun. 26, 2006.

NPL5—Kalapathy et al., “An Improved Method for Production of Silica from Rice Hull Ash,” Bioresource Technology 85 (2002) 285-289, Apr. 28, 2002 (Cited in ISA/EPO).

NPL6—Geetha et al., “Preparation and Characterization of Silica Material from Rice Husk Ash—An Economically Viable Method” Research & Reviews: Journal of Pure and Applied Physics, vol. 4 | Issue 3 | Jun. 2016 (Jul. 29, 2016).

NPL8—Kumar et al.,“Utilization of Rice Husk and Their Ash: A Review,” Res. J. Chem. Env. Sci., vol. 1 Issue Dec. 5, 2013: 126-129.

NPL12—Thornton, “Pharmaceuticals Waters Guide, ”pp. 1-10, downloaded from https://alliancets.com/images/ alliancets/PDF/Resources/Pharmaceutical-Waters-Guide-for-Regulatory-Compliance-Analysis-and-Real-Time-Release.pdf on Aug. 10, 2020.

NPL13—Puretec,“Laboratory Water Quality Standards,” downloaded from https://puretecwater.com/deionized-water/laboratory-water-quality-standards on Aug. 10, 2020.

NPL14—US PreGrant Publication Database Search Results/ spec-rice and spec-hull and spec-ash and spec-silica in PGPUB Production Database Mar. 15-Sep. 30, 2001 (Searched on Aug. 2, 2015).

NPL15—Expansive Agritec Espacenet search results (searched on Aug. 4, 2015).

NPL16—Rice hull ash (Espacenet) search results (searched on Aug. 2, 2015).

NPL17—Jan. 4, 2023 Office action in related Chinese patent application (CN 201980016869.6).

NPL18—Machine Translation into English of Jan. 4, 2023 Office action in related Chinese patent application (CN 201980016869.6).

NPL19—Translation into English of Jul. 28, 2023 second Office action in related Chinese patent application (CN 201980016869.6).

100b

300b

SUSTAINABLE SILICATES AND METHODS FOR THEIR EXTRACTION

CROSS REFERENCE TO RELATED APPLICATION

This application is a continuation of U.S. patent application Ser. No. 16/969,180, which was filed on Aug 11. 2020, which is a National Stage of, and claims priority from, International Application No. PCT/US2019/018340, which was filed on Feb. 15, 2019, the contents of which are herein incorporated by reference in their entirety for all purposes which is a non-provisional application of, and claims priority from, U.S. Provisional Application No. 62/637,848, which was filed on Mar. 2, 2018, the contents of which are herein incorporated by reference in their entirety for all purposes.

TECHNICAL FIELD

This application generally relates to systems, methods, and/or products concerning silicates and, in particular, to systems, methods, and/or products concerning biogenic silicates.

BACKGROUND INFORMATION

Silicon dioxide ($SiO_2$), also known as silica, is an oxide of silicon, most commonly found in nature in various living organisms and as quartz, and is the major constituent of sand. Silica is one of the most complex and most abundant families of materials, existing as a compound of several minerals and as synthetic product. Notable examples include aerogels, fumed silica, fused quartz, and silica gel.

Silica is one of the most versatile industrial minerals, having industrial uses in microelectronics, structural materials, and as components in the food and pharmaceutical industries. Silica (often in form of silicates) is used for adhesives, binders, building materials, catalysts, ceramics, concrete, corrosion-resistant coatings, detergents, drilling fluids, industrial cleaners, paints, personal care products, and waste and water treatment. The global annual demand for silica is greater than 275 million metric tons and has been increasing at a rate of over 3% per year.

To meet this need, quartz sand that contains silica in a crystalline form is mined, washed, and transported to a processing facility. The crystalline silica sand is melted with sodium carbonate in large electrical furnaces at temperatures greater than or equal to 1300° C. to create sodium silicate solids. The raw silicate solids, also called cullet, are then transported to a dissolving facility where it is typically dissolved with steam and water to make sand-based liquid amorphous sodium silicate ($(Na_2SiO_2)_nO$), including $Na_2SiO_3$. This sand-based sodium silicate is relatively impure, having high turbidity from suspended solids and having high concentrations of heavy metals, including aluminum (Al) concentrations of greater than 75 ppm and iron (Fe) concentrations greater than 50 ppm. Moreover, the conversion of the crystallized silica to the amorphous form is expensive and time-consuming.

Amorphous silica can also be obtained from biogenic materials, such as rice hulls or other organic plant materials. Rice hulls primarily include organic materials such as lignin, cellulose, and hemicellulose. However, the combustion of the rice hulls can result in rice hull ash that contains greater than 90% silica and only about 6% carbon. The rice hull ash also contains metallic impurities, such as calcium (Ca), iron (Fe), manganese (Mn), magnesium (Mg), potassium (K) and sodium (Na). Attempts to pretreat the rice hulls prior to combustion have been reported to reduce these metallic impurities. However, these rice hull pretreatments appear to be expensive, time-consuming, and requires the use of large amounts of acid solutions.

OVERVIEW OF DISCLOSURE

This overview is provided to introduce a selection of concepts in a simplified form that are further described in greater detail below. This overview is not intended to identify key or essential inventive concepts of the claimed subject matter, nor is it intended for limiting the scope of the claimed subject matter.

In some embodiments, a target sodium silicate solution, comprises: biogenic silica in an amorphous state; sodium hydroxide; and water, wherein the target sodium solution has a ratio R of $SiO_2$:$Na_2O$ by weight that is greater than or equal to 1.8, wherein the target sodium silicate solution has a combined chloride ion and sulfate ion concentration that is equivalent to less than or equal to 250 ppm in a standardized sodium silicate solution that has approximately 37% solids by weight and that has a ratio R by weight of $SiO_2$ to $Na_2O$ that is approximately 3.3, and wherein the target sodium silicate solution has a total organic content that is equivalent to less than approximately 30 ppm in the standardized sodium silicate solution.

In some alternative, additional, or cumulative embodiments, a target sodium silicate solution, comprises: biogenic silica in an amorphous state; sodium hydroxide; and water, wherein the solution has a ratio R of $SiO_2$:$Na_2O$ by weight that is greater than or equal to 1.8, wherein the solution has a chloride ion concentration that is equivalent to less than or equal to 75 ppm in a standardized sodium silicate solution that has approximately 37% solids by weight and that has a ratio by weight of silica to sodium oxide that is approximately 3.3, and wherein the target sodium silicate solution has a total organic content that is equivalent to less than approximately 30 ppm in the standardized sodium silicate solution.

In some alternative, additional, or cumulative embodiments, a target sodium silicate solution comprises: biogenic silica in an amorphous state; sodium hydroxide; and water, wherein the solution has a ratio R of $SiO_2$:$Na_2O$ by weight that is greater than or equal to 1.8, wherein the solution has a sulfate ion concentration that is equivalent to less than or equal to 75 ppm in a standardized sodium silicate solution that has approximately 37% solids by weight and that has a ratio by weight of silica to sodium oxide that is approximately 3.3, and wherein the target sodium silicate solution has a total organic content that is equivalent to less than approximately 30 ppm in the standardized sodium silicate solution.

In some alternative, additional, or cumulative embodiments, a method of producing a target sodium silicate solution from burned organic matter, comprises: contacting ash from burned organic matter with clean water, wherein the ash contains amorphous silica, and wherein the clean water has a rinse temperature that is greater than 15° C.; separating rinsed ash from contaminated rinse water, wherein the rinsed ash contains amorphous silica and water, and wherein the contaminated rinse water contains chlorides, sulfates, and other water soluble contaminants; heating a reaction mixture, including the rinsed ash in the presence of sodium hydroxide, in a first reaction chamber to a reaction temperature greater than 90° C. and less than 200°

C. and to a reaction pressure greater than or equal to 100,000 pascals (1 bar) to provide a pressure-cooked reaction mixture containing liquid sodium silicate with water soluble contaminants and undissolved solids; separating the pressure-cooked reaction mixture to separate a preliminary sodium silicate solution from at least some of the undissolved solids, wherein the preliminary sodium silicate solution contains amorphous silica; and separating the preliminary sodium silicate solution to remove at least some soluble organic molecules from the preliminary sodium silicate solution to provide the target sodium silicate solution containing amorphous silica.

In some alternative, additional, or cumulative embodiments, a system for producing a sodium silicate solution having amorphous silica from ash containing biogenic silica, the system comprises: a rinsing station for rinsing the ash with water at a temperature greater than 15° C. to provide rinsed ash and contaminated water, wherein the rinsed ash contains amorphous silica; a first separation station to separate contaminated water from the rinsed; a reaction chamber for heating the rinsed ash in the presence of sodium hydroxide to a reaction temperature that is greater than 90° C. and less than 200° C. and to a reaction pressure greater than or equal to 120,000 pascals (1.2 bars) to provide a pressure-cooked reaction mixture containing amorphous silica and undissolved solids; a second separation station to separate a preliminary sodium silicate solution from at least some of the undissolved solids, wherein the preliminary sodium silicate solution contains amorphous silica; and activated carbon media to remove at least some soluble organic molecules from the preliminary sodium silicate solution to provide the target sodium silicate solution containing amorphous silica.

In some alternative, additional, or cumulative embodiments, the target sodium silicate solution has a combined chloride ion and sulfate ion concentration that is equivalent to less than or equal to 225 ppm in the standardized sodium silicate solution.

In some alternative, additional, or cumulative embodiments, the target sodium silicate solution has a combined chloride ion and sulfate ion concentration that is equivalent to less than or equal to 200 ppm in the standardized sodium silicate solution.

In some alternative, additional, or cumulative embodiments, the target sodium silicate solution has a combined chloride ion and sulfate ion concentration that is equivalent to less than or equal to 175 ppm in the standardized sodium silicate solution.

In some alternative, additional, or cumulative embodiments, the target sodium silicate solution has a combined chloride ion and sulfate ion concentration that is equivalent to less than or equal to 150 ppm in the standardized sodium silicate solution.

In some alternative, additional, or cumulative embodiments, the target sodium silicate solution has a combined chloride ion and sulfate ion concentration that is equivalent to less than or equal to 100 ppm in the standardized sodium silicate solution.

In some alternative, additional, or cumulative embodiments, the target sodium silicate solution has 10 to 40% of sodium silicate by dry content weight.

In some alternative, additional, or cumulative embodiments, the target sodium silicate solution has 20 to 40% of sodium silicate by dry content weight.

In some alternative, additional, or cumulative embodiments, the target sodium silicate solution has 30 to 40% of sodium silicate by dry content weight.

In some alternative, additional, or cumulative embodiments, the target sodium silicate solution has 35 to 40% of sodium silicate by dry content weight.

In some alternative, additional, or cumulative embodiments, the target sodium silicate solution has approximately 37% of sodium silicate by dry content weight.

In some alternative, additional, or cumulative embodiments, the biogenic silica is from ash of burned organic matter.

In some alternative, additional, or cumulative embodiments, the biogenic silica is from ash of burned rice hulls.

In some alternative, additional, or cumulative embodiments, the biogenic silica is from ash of burned rice hulls, and wherein the rice hulls are untreated.

In some alternative, additional, or cumulative embodiments, the biogenic silica is from ash of burned rice hulls, and wherein the rice hulls are unwashed.

In some alternative, additional, or cumulative embodiments, the biogenic silica is from ash of burned rice hulls, and wherein the rice hulls are untreated by an acidic solution.

In some alternative, additional, or cumulative embodiments, the ash is untreated.

In some alternative, additional, or cumulative embodiments, the ash is unwashed.

In some alternative, additional, or cumulative embodiments, the ash is untreated by an acidic solution.

In some alternative, additional, or cumulative embodiments, the target sodium silicate solution is produced from rice hull ash, and wherein the silica is maintained below a temperature of 200° C.

In some alternative, additional, or cumulative embodiments, the target sodium silicate solution is produced from rice hull ash, and wherein the amorphous silica is converted to silicate at or below 175° C.

In some alternative, additional, or cumulative embodiments, the target sodium silicate solution is produced from rice hull ash, and wherein the amorphous silica is converted to silicate at or below 160° C.

In some alternative, additional, or cumulative embodiments, the target sodium silicate solution is produced from rice hull ash, and wherein the amorphous silica is converted to silicate at or below 90° C.

In some alternative, additional, or cumulative embodiments, the target sodium silicate solution is produced from rice hull ash, and wherein the amorphous silica is converted to silicate at or above 90° C.

In some alternative, additional, or cumulative embodiments, the target sodium silicate solution has a ratio R of $SiO_2$:$Na_2O$ by weight that is greater than or equal to 3.22.

In some alternative, additional, or cumulative embodiments, the target sodium silicate solution has a ratio R of $SiO_2$:$Na_2O$ by weight that is greater than or equal to 3.5.

In some alternative, additional, or cumulative embodiments, the target sodium silicate solution has a ratio R of $SiO_2$:$Na_2O$ by weight that is greater than or equal to 3.75.

In some alternative, additional, or cumulative embodiments, the target sodium silicate solution has a ratio R of $SiO_2$:$Na_2O$ by weight that is greater than or equal to 3.9.

In some alternative, additional, or cumulative embodiments, the target sodium silicate solution has a ratio R of $SiO_2$:$Na_2O$ by weight that is greater than or equal to 4.0.

In some alternative, additional, or cumulative embodiments, the target sodium silicate solution has a percentage of undissolved solids by weight that have a minimum dimension greater than 2 microns, wherein the percentage of such undissolved solids is equivalent to less than or equal to 0.001% in the standardized sodium silicate solution.

In some alternative, additional, or cumulative embodiments, the target sodium silicate solution has a percentage of undissolved solids by weight that have a minimum dimension greater than 1 micron, wherein the percentage of such undissolved solids is equivalent to less than or equal to 0.001% in the standardized sodium silicate solution.

In some alternative, additional, or cumulative embodiments, the target sodium silicate solution has a chloride ion concentration that is equivalent to less than 100 ppm in the standardized sodium silicate solution.

In some alternative, additional, or cumulative embodiments, the target sodium silicate solution has a chloride ion concentration that is equivalent to less than 75 ppm in the standardized sodium silicate solution.

In some alternative, additional, or cumulative embodiments, the target sodium silicate solution has a chloride ion concentration that is equivalent to less than 60 ppm in the standardized sodium silicate solution.

In some alternative, additional, or cumulative embodiments, the target sodium silicate solution has a chloride ion concentration that is equivalent less than 40 ppm in the standardized sodium silicate solution.

In some alternative, additional, or cumulative embodiments, the target sodium silicate solution has a chloride ion concentration that is equivalent to less than 25 ppm in the standardized sodium silicate solution.

In some alternative, additional, or cumulative embodiments, the target sodium silicate solution has a sulfate ion concentration that is equivalent to less than 100 ppm in the standardized sodium silicate solution.

In some alternative, additional, or cumulative embodiments, the target sodium silicate solution has a sulfate ion concentration that is equivalent to less than 75 ppm in the standardized sodium silicate solution.

In some alternative, additional, or cumulative embodiments, the target sodium silicate solution has a sulfate ion concentration that is equivalent to less than 50 ppm in the standardized sodium silicate solution.

In some alternative, additional, or cumulative embodiments, the target sodium silicate solution has a sulfate ion concentration that is equivalent to less than 25 ppm in the standardized sodium silicate solution.

In some alternative, additional, or cumulative embodiments, the target sodium silicate solution has a sulfate ion concentration that is equivalent to less than 10 ppm in the standardized sodium silicate solution.

In some alternative, additional, or cumulative embodiments, the target sodium silicate solution has a calcium concentration that is equivalent to less than 25 ppm in the standardized sodium silicate solution.

In some alternative, additional, or cumulative embodiments, the target sodium silicate solution has a calcium concentration that is equivalent to less than 15 ppm in the standardized sodium silicate solution.

In some alternative, additional, or cumulative embodiments, the target sodium silicate solution has a calcium concentration that is equivalent to less than 10 ppm in the standardized sodium silicate solution.

In some alternative, additional, or cumulative embodiments, the target sodium silicate solution has a magnesium concentration that is equivalent to less than 10 ppm in the standardized sodium silicate solution.

In some alternative, additional, or cumulative embodiments, the target sodium silicate solution has a magnesium concentration that is equivalent to less than or equal to 5 ppm in the standardized sodium silicate solution.

In some alternative, additional, or cumulative embodiments, the target sodium silicate solution has an aluminum concentration that is equivalent to less than or equal to 50 ppm in the standardized sodium silicate solution.

In some alternative, additional, or cumulative embodiments, the target sodium silicate solution has an aluminum concentration that is equivalent to less than or equal to 40 ppm in the standardized sodium silicate solution.

In some alternative, additional, or cumulative embodiments, the target sodium silicate solution has an aluminum concentration that is equivalent to less than or equal to 25 ppm in the standardized sodium silicate solution.

In some alternative, additional, or cumulative embodiments, the target sodium silicate solution has an iron concentration that is equivalent to less than or equal to 25 ppm in the standardized sodium silicate solution.

In some alternative, additional, or cumulative embodiments, the target sodium silicate solution has an iron concentration that is equivalent to less than or equal to 15 ppm in the standardized sodium silicate solution.

In some alternative, additional, or cumulative embodiments, the target sodium silicate solution has a nephelometric turbidity that is equivalent to less than 2 units in the standardized sodium silicate solution.

In some alternative, additional, or cumulative embodiments, the target sodium silicate solution has a nephelometric turbidity that is equivalent to less than 1.5 units in the standardized sodium silicate solution.

In some alternative, additional, or cumulative embodiments, the target sodium silicate solution has a total organic content that is equivalent to less than approximately 20 ppm in the standardized sodium silicate solution.

In some alternative, additional, or cumulative embodiments, the target sodium silicate solution has a total organic content that is equivalent to less than approximately 10 ppm in the standardized sodium silicate solution.

In some alternative, additional, or cumulative embodiments, the target sodium silicate solution has concentrations equivalent to the standardized solution having less than or equal to: 100 ppm chloride ion, 50 ppm calcium, 50 ppm sulfate ion, 75 ppm aluminum, 50 ppm iron, and 10 ppm titanium, wherein the target sodium silicate solution has concentrations equivalent to the standardized solution having a nephelometric turbidity that is less than 2, and wherein the target sodium silicate solution has concentrations equivalent to the standardized solution having a total organic content that is less than 30 ppm.

In some alternative, additional, or cumulative embodiments, the target sodium silicate solution has biogenic silica from rinsed ash from organic matter.

In some alternative, additional, or cumulative embodiments, at least some of the soluble organic molecules comprise lignin.

In some alternative, additional, or cumulative embodiments, at least some of the soluble organic molecules comprise furfural.

In some alternative, additional, or cumulative embodiments, at least some of the soluble organic molecules comprise 5-hydroxymethylfurfural (HMF).

In some alternative, additional, or cumulative embodiments, the rinse temperature that is greater than or equal to 20° C.

In some alternative, additional, or cumulative embodiments, the rinse temperature that is greater than or equal to 25° C.

In some alternative, additional, or cumulative embodiments, the rinse temperature that is greater than or equal to 30° C.

In some alternative, additional, or cumulative embodiments, the rinse temperature that is greater than or equal to 50° C.

In some alternative, additional, or cumulative embodiments, the rinse temperature that is greater than or equal to 75° C.

In some alternative, additional, or cumulative embodiments, the rinse temperature that is greater than or equal to 90° C.

In some alternative, additional, or cumulative embodiments, the rinse temperature that is less than or equal to 200° C.

In some alternative, additional, or cumulative embodiments, the rinse temperature that is less than or equal to 150° C.

In some alternative, additional, or cumulative embodiments, the rinse temperature that is less than or equal to 100° C.

In some alternative, additional, or cumulative embodiments, the clean water has a pH greater than or equal to 6 and less than or equal to 8.

In some alternative, additional, or cumulative embodiments, the clean water has a pH greater than or equal to 6.5 and less than or equal to 7.5.

In some alternative, additional, or cumulative embodiments, the clean water has a pH greater than or equal to 6.7 and less than or equal to 7.2.

In some alternative, additional, or cumulative embodiments, the clean water has a resistivity (MΩ-cm) greater than 1.

In some alternative, additional, or cumulative embodiments, the clean water employs deionized (DI) water.

In some alternative, additional, or cumulative embodiments, contacting the ash with clean water entails rinsing the ash with clean water.

In some alternative, additional, or cumulative embodiments, contacting the ash with clean water entails washing the ash with clean water.

In some alternative, additional, or cumulative embodiments, contacting the ash with clean water entails mixing the ash with clean water.

In some alternative, additional, or cumulative embodiments, contacting the ash with clean water employs multiple passes of clean water through the ash.

In some alternative, additional, or cumulative embodiments, contacting the ash with clean water employs a continuous stream of clean water.

In some alternative, additional, or cumulative embodiments, the step of contacting utilizes greater than 1 liter of deionized water per kilogram of the ash.

In some alternative, additional, or cumulative embodiments, the reaction temperature is less than or equal to 175° C.

In some alternative, additional, or cumulative embodiments, the reaction temperature is greater than or equal to 100° C.

In some alternative, additional, or cumulative embodiments, the reaction temperature is greater than or equal to 120° C.

In some alternative, additional, or cumulative embodiments, the reaction temperature is greater than or equal to 150° C.

In some alternative, additional, or cumulative embodiments, the reaction temperature is greater than or equal to 160° C.

In some alternative, additional, or cumulative embodiments, the reaction pressure is greater than or equal to 120,000 pascals (1.2 bars).

In some alternative, additional, or cumulative embodiments, the reaction pressure is greater than or equal to 200,000 pascals (2 bars).

In some alternative, additional, or cumulative embodiments, the reaction pressure is greater than or equal to 300,000 pascals (3 bars).

In some alternative, additional, or cumulative embodiments, the reaction pressure is greater than or equal to 400,000 pascals (4 bars).

In some alternative, additional, or cumulative embodiments, the reaction pressure is greater than or equal to 500,000 pascals (5 bars).

In some alternative, additional, or cumulative embodiments, the reaction pressure is less than or equal to 700,000 pascals (7 bars).

In some alternative, additional, or cumulative embodiments, the reaction pressure is less than or equal to 600,000 pascals (6 bars).

In some alternative, additional, or cumulative embodiments, the reaction pressure is less than or equal to 500,000 pascals (5 bars).

In some alternative, additional, or cumulative embodiments, the reaction pressure is less than or equal to 400,000 pascals (4 bars).

In some alternative, additional, or cumulative embodiments, the reaction temperature is maintained for greater than or equal to 1 hour.

In some alternative, additional, or cumulative embodiments, the reaction temperature is maintained for greater than or equal to 1.5 hours.

In some alternative, additional, or cumulative embodiments, the reaction temperature is maintained for shorter than or equal to 3 hours.

In some alternative, additional, or cumulative embodiments, the reaction temperature is maintained for shorter than or equal to 2 hours.

In some alternative, additional, or cumulative embodiments, the reaction chamber is sealed during heating of the reaction mixture.

In some alternative, additional, or cumulative embodiments, the undissolved solids comprise insoluble organic molecules, unreacted silica, and/or insoluble contaminants.

In some alternative, additional, or cumulative embodiments, the insoluble contaminants comprise sparingly soluble salts.

In some alternative, additional, or cumulative embodiments, the sparingly soluble salts comprise calcium hydroxide ($Ca(OH)_2$), magnesium oxide (MgO), and/or iron oxide ($Fe_2O_3$, $Fe_3O_4$).

In some alternative, additional, or cumulative embodiments, separating the pressure-cooked reaction mixture employs a first post-reaction filter media that has a pore size of less than or equal to 2 microns.

In some alternative, additional, or cumulative embodiments, separating the pressure-cooked reaction mixture employs a first post-reaction filter media that has a pore size of less than or equal to 1 micron.

In some alternative, additional, or cumulative embodiments, separating the pressure-cooked reaction mixture employs a first post-reaction filter media that has a pore size of less than or equal to 0.5 microns.

In some alternative, additional, or cumulative embodiments, separating the pressure-cooked reaction mixture employs a first post-reaction filter media that has a pore size of less than or equal to 0.1 micron.

In some alternative, additional, or cumulative embodiments, separating the pressure-cooked reaction mixture employs a fabric or screen.

In some alternative, additional, or cumulative embodiments, separating the pressure-cooked reaction mixture employs a pressure differential across a porous filtering media.

In some alternative, additional, or cumulative embodiments, separating the pressure-cooked reaction mixture employs a separating device using centrifugal force as a means of separating the solids from liquid.

In some alternative, additional, or cumulative embodiments, the preliminary sodium silicate solution has a percentage of undissolved solids by weight that have a minimum dimension greater than 2 microns, wherein the percentage of such undissolved solids is equivalent to less than or equal to 0.001% in a standardized sodium silicate solution that has approximately 37% solids by weight and that has a ratio by weight of silica to sodium oxide that is approximately 3.3.

In some alternative, additional, or cumulative embodiments, separating the pressure-cooked reaction mixture employs a pressure differential greater than 20,000 pascals to separate the preliminary sodium silicate solution from at least some of the undissolved solids.

In some alternative, additional, or cumulative embodiments, separating the pressure-cooked reaction mixture employs a temperature of less than 160° C.

In some alternative, additional, or cumulative embodiments, separating the pressure-cooked reaction mixture employs a temperature of less than 110° C.

In some alternative, additional, or cumulative embodiments, separating the preliminary sodium silicate solution to remove at least some soluble organic molecules employs a second post-reaction filter media.

In some alternative, additional, or cumulative embodiments, separating the preliminary sodium silicate solution employs activated carbon.

In some alternative, additional, or cumulative embodiments, separating the preliminary sodium silicate solution employs a carbon molecular sieve (CMS).

In some alternative, additional, or cumulative embodiments, separating the preliminary sodium silicate solution employs adsorbents.

In some alternative, additional, or cumulative embodiments, separating the preliminary sodium silicate solution employs zeolite.

In some alternative, additional, or cumulative embodiments, separating the preliminary sodium silicate solution employs a peroxide treatment.

In some alternative, additional, or cumulative embodiments, the peroxide treatment is accompanied by a UV light treatment.

In some alternative, additional, or cumulative embodiments, separating the preliminary sodium silicate solution is conducted at a temperature of less than 75° C.

In some alternative, additional, or cumulative embodiments, the target sodium silicate solution is heated to evaporate water to obtain 30 to 40% of sodium silicate by dry content weight.

In some alternative, additional, or cumulative embodiments, the target sodium silicate solution is heated to evaporate water to obtain 10 to 30% of sodium silicate by dry content weight.

In some alternative, additional, or cumulative embodiments, the amorphous silica is maintained below a temperature of 200° C. from when the amorphous silica is in the rinsed ash slurry through when the amorphous silica is in the target sodium silicate solution.

In some alternative, additional, or cumulative embodiments, the amorphous silica is maintained below a temperature of 175° C. from when the amorphous silica is in the rinsed ash slurry through when the amorphous silica is in the target sodium silicate solution.

In some alternative, additional, or cumulative embodiments, the amorphous silica is maintained at a pH in a range from 7 to 14 from when the amorphous silica is in the ash through when the amorphous silica is in the rinsed ash slurry.

In some alternative, additional, or cumulative embodiments, the amorphous silica is maintained at a pH in a range from 8 to 12 from when the amorphous silica is in the ash through when the amorphous silica is in the rinsed ash slurry.

In some alternative, additional, or cumulative embodiments, the amorphous silica is maintained at a pH in a range from 8 to 10 from when the amorphous silica is in the ash through when the amorphous silica is in the rinsed ash slurry.

In some alternative, additional, or cumulative embodiments, production of the sodium silicate solution utilizes greater than or equal to 2 liters of water per kilogram of sodium silicate by dry content weight from when the amorphous silica is in the ash through when the amorphous silica is in the target sodium silicate solution.

In some alternative, additional, or cumulative embodiments, production of the sodium silicate solution utilizes less than or equal to 9 joules per kilogram of sodium silicate by dry content weight from when the amorphous silica is in the ash through when the amorphous silica is in the target sodium silicate solution.

In some alternative, additional, or cumulative embodiments, production of the sodium silicate solution utilizes less than or equal to 6.5 joules per kilogram of sodium silicate by dry content weight from when the amorphous silica is in the ash through when the amorphous silica is in the target sodium silicate solution.

In some alternative, additional, or cumulative embodiments, production of the sodium silicate solution utilizes less than or equal to 4 joules per kilogram of sodium silicate by dry content weight from when the amorphous silica is in the ash through when the amorphous silica is in the target sodium silicate solution.

In some alternative, additional, or cumulative embodiments, production of the sodium silicate solution utilizes greater than or equal to 4 joules per kilogram of sodium silicate by dry content weight from when the amorphous silica is in the ash through when the amorphous silica is in the target sodium silicate solution.

In some alternative, additional, or cumulative embodiments, production of the sodium silicate solution utilizes greater than or equal to 6.5 joules per kilogram of sodium silicate by dry content weight from when the amorphous silica is in the ash through when the amorphous silica is in the target sodium silicate solution.

In some alternative, additional, or cumulative embodiments, production of the sodium silicate solution utilizes greater than or equal to 9 joules per kilogram of sodium silicate by dry content weight from when the amorphous silica is in the ash through when the amorphous silica is in the target sodium silicate solution.

In some alternative, additional, or cumulative embodiments, the burned organic matter comprises ash from combusted rice hulls, and wherein the rice hulls are burned at temperature less than or equal to 800° C.

In some alternative, additional, or cumulative embodiments, the burned organic matter comprises rice hull ash, and wherein the method has a yield of greater than or equal to 75% of the amorphous silica in the rice hull ash.

In some alternative, additional, or cumulative embodiments, the burned organic matter comprises rice hull ash, and wherein the method has a yield of greater than or equal to 80% of the amorphous silica in the rice hull ash In some alternative, additional, or cumulative embodiments, the burned organic matter comprises rice hull ash, and wherein the method has a yield of greater than or equal to 82% of the amorphous silica in the rice hull ash.

In some alternative, additional, or cumulative embodiments, the burned organic matter comprises rice hull ash, and wherein the method has the capability to consume a minimum of 11.4 kilograms of rice hull ash per hour.

In some alternative, additional, or cumulative embodiments, the burned organic matter comprises rice hull ash, and wherein the method has the capability to consume a minimum of 114 kilograms of rice hull ash per hour.

In some alternative, additional, or cumulative embodiments, the burned organic matter comprises rice hull ash, and wherein the method has the capability to consume a minimum of 1,142 kilograms of rice hull ash per hour.

In some alternative, additional, or cumulative embodiments, the target sodium silicate solution is heated to evaporate water, and wherein the evaporated water is employed in the step of contacting the ash.

In some alternative, additional, or cumulative embodiments, the pressure-cooked reaction mixture or the preliminary sodium silicate solution travels through a heat exchanger to cool to a lower temperature, wherein the clean water flows through the heat exchanger before the step of contacting, and wherein the clean water is below the rinse temperature before the clean water flows through the heat exchanger.

One of many advantages of these embodiments is that the resulting sodium silicate solution can have greater purity and/or lower cost than that produced by conventional processes.

Additional aspects and advantages will be apparent from the following detailed description of exemplary embodiments, which proceeds with reference to the accompanying drawings.

DETAILED DESCRIPTION OF EXEMPLARY EMBODIMENTS

Figure 1A:
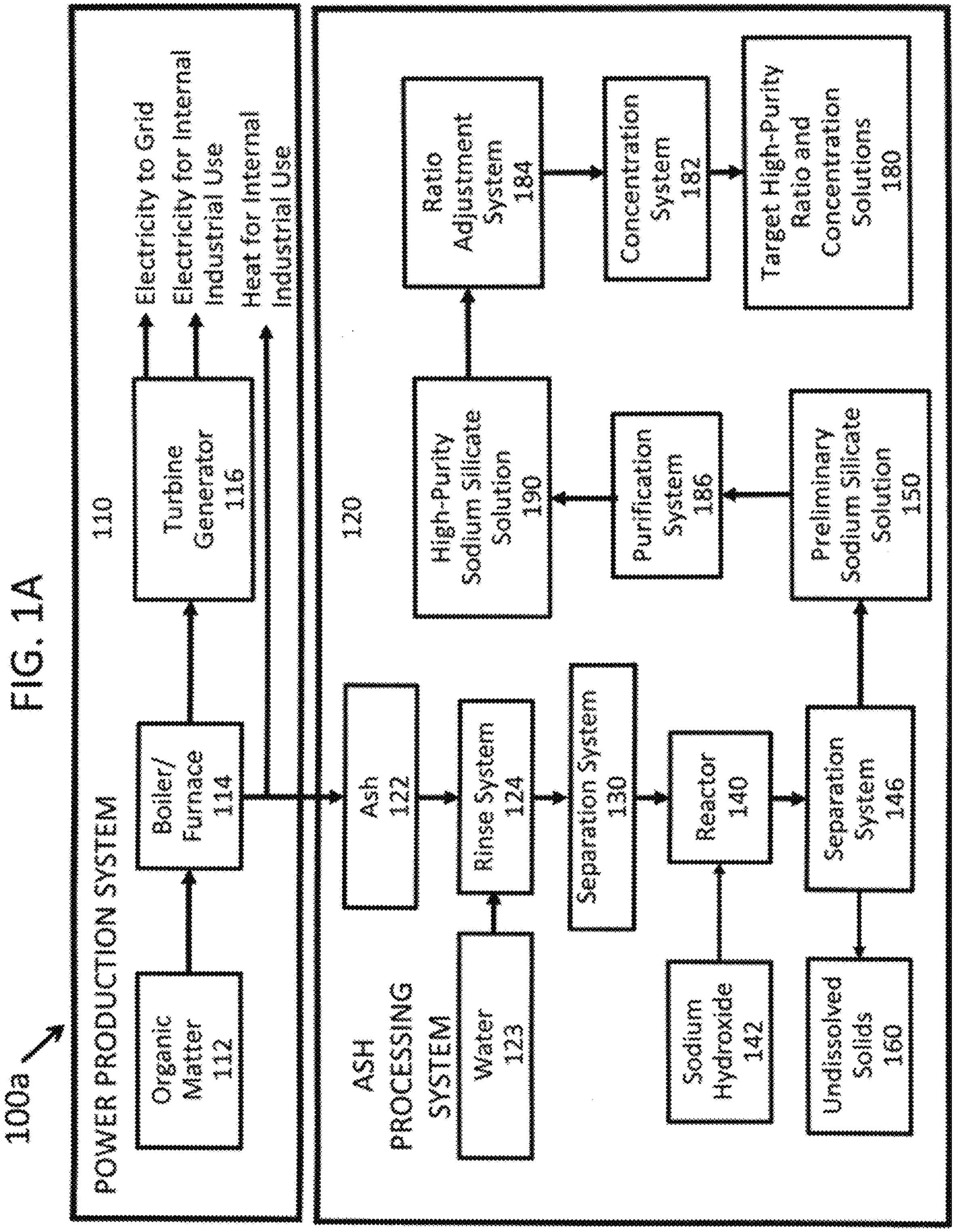
FIG. 1A is a block diagram, showing an overview of an exemplary system that may employed for processing organic matter, such as rice hull ash, that contains amorphous silica.

Example embodiments are described below with reference to the accompanying drawings. Unless otherwise expressly stated, in the drawings the sizes, positions, etc., of components, features, elements, etc., as well as any distances between them, are not necessarily to scale, and may be disproportionate and/or exaggerated for clarity.

The terminology used herein is for the purpose of describing particular example embodiments only and is not intended to be limiting. As used herein, the singular forms "a," "an" and "the" are intended to include the plural forms as well, unless the context clearly indicates otherwise. It should be recognized that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise specified, a range of values, when recited, includes both the upper and lower limits of the range, as well as any sub-ranges between them. Unless indicated otherwise, terms such as "first," "second," etc., are only used to distinguish one element from another. For example, one element could be termed a "first element" and similarly, another element could be termed a "second element", or vice versa. The section headings used herein are for organizational purposes only and are not to be construed as limiting the subject matter described.

Unless indicated otherwise, the term "about," "thereabout," etc., means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art.

Spatially relative terms, such as "below," "beneath," "lower," "above," and "upper," and the like, may be used herein for ease of description to describe one element or feature's relationship to another element or feature, as illustrated in the figures. It should be recognized that the spatially relative terms are intended to encompass different orientations in addition to the orientation depicted in the figures. For example, if an object in the figures is turned over, elements described as "below" or "beneath" other elements or features would then be oriented "above" the other elements or features. Thus, the exemplary term "below" can encompass both an orientation of above and below. An object may be otherwise oriented (e.g., rotated 90 degrees or at other orientations) and the spatially relative descriptors used herein may be interpreted accordingly.

Like numbers refer to like elements throughout. Thus, the same or similar numbers may be described with reference to other drawings even if they are neither mentioned nor described in the corresponding drawing. Also, even elements that are not denoted by reference numbers may be described with reference to other drawings.

Many different forms and embodiments are possible without deviating from the spirit and teachings of this disclosure and so this disclosure should not be construed as limited to the example embodiments set forth herein. Rather, these example embodiments are provided so that this disclosure will be thorough and complete, and will convey the scope of the disclosure to those skilled in the art.

Biogenic silicon or silica generally accumulates in monocotyledonous plants, particularly plants of the families Poaceae, Equisetaceae and Cyperaceae. Rice is a member of the Poaceae family, and close to 750 million metric tons of rice are produced globally every year. The hulls surrounding each grain of rice account for about 20% of the weight of the rice crop and can be combusted to produce rice hull ash that contains greater than 90% silica (typically 90-92%), as previously noted. Organic matter as a source for biogenic silica is, therefore, presented herein only by way of example to rice hulls and their ash combustion product. One will appreciate that other sources of biogenic silica are known and can be used for the source of sustainable silicate production as discussed herein. One will also appreciate that even different varieties of rice, or the same variety grown in indifferent soils and/or conditions will express different amounts of silica and different amounts or types of undesirable contaminants, such as the impurities previously listed.

Furthermore, waste or byproduct organic matter is often burned to generate energy for consumer consumption or for industrial processes (often in the form of heat). The quality of the ash byproduct of organic combustion is not typically considered when the primary purpose of the combustion is for energy production. Under various conditions, the combustion of rice hulls at temperatures greater than or equal to 700° C. can reduce the yield of amorphous silica with some of the silica being converted to the crystalline form, especially during longer combustion times and/or at higher temperatures. Combustion can be maintained at 700° C. or less for shorter periods, but such combustion limitations can increase the amount of carbon impurities in the rice hull ash. These carbon impurities are not a factor for the sand-based silica processes.

The concepts provided in this disclosure can be applied to the ash of the organic material regardless of the source and/or treatment of organic matter.

Figure 1B:
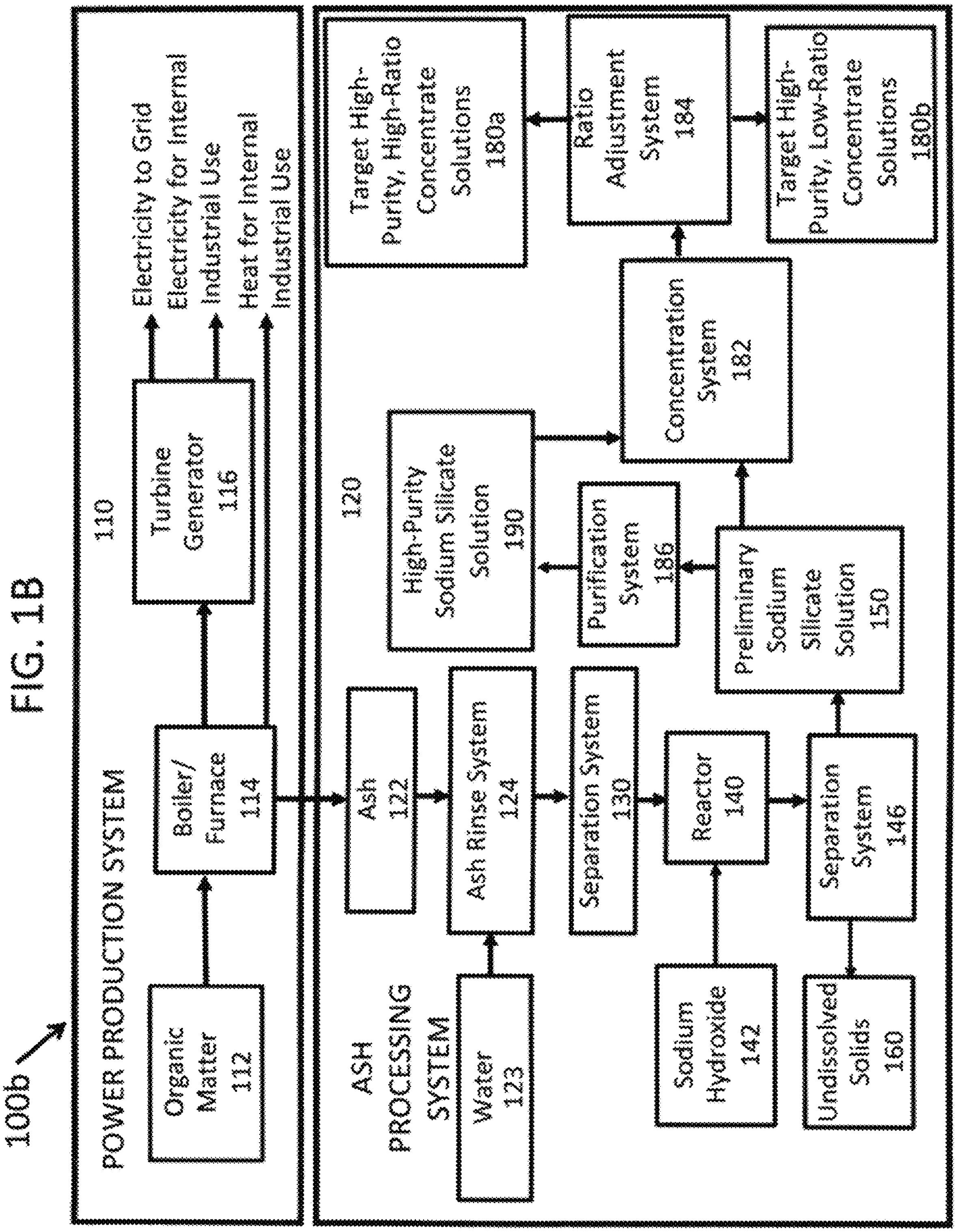
FIG. 1B is a block diagram, showing an overview of an exemplary system that may employed for processing organic matter, such as rice hull ash, that contains amorphous silica.
Figure 2:
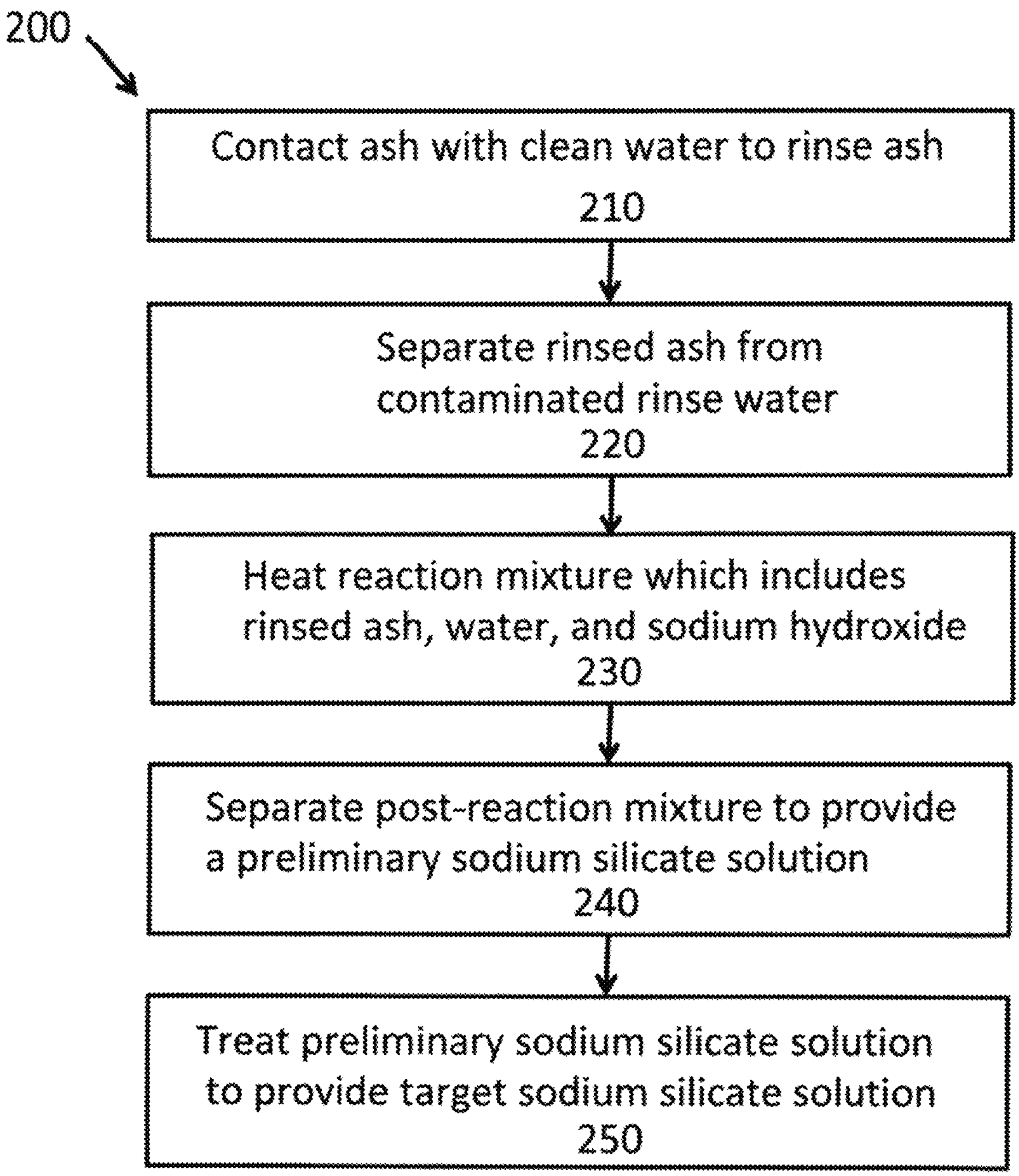
FIG. 2 is a flow diagram, showing some exemplary process steps for treating organic ash.
Figure 3A:
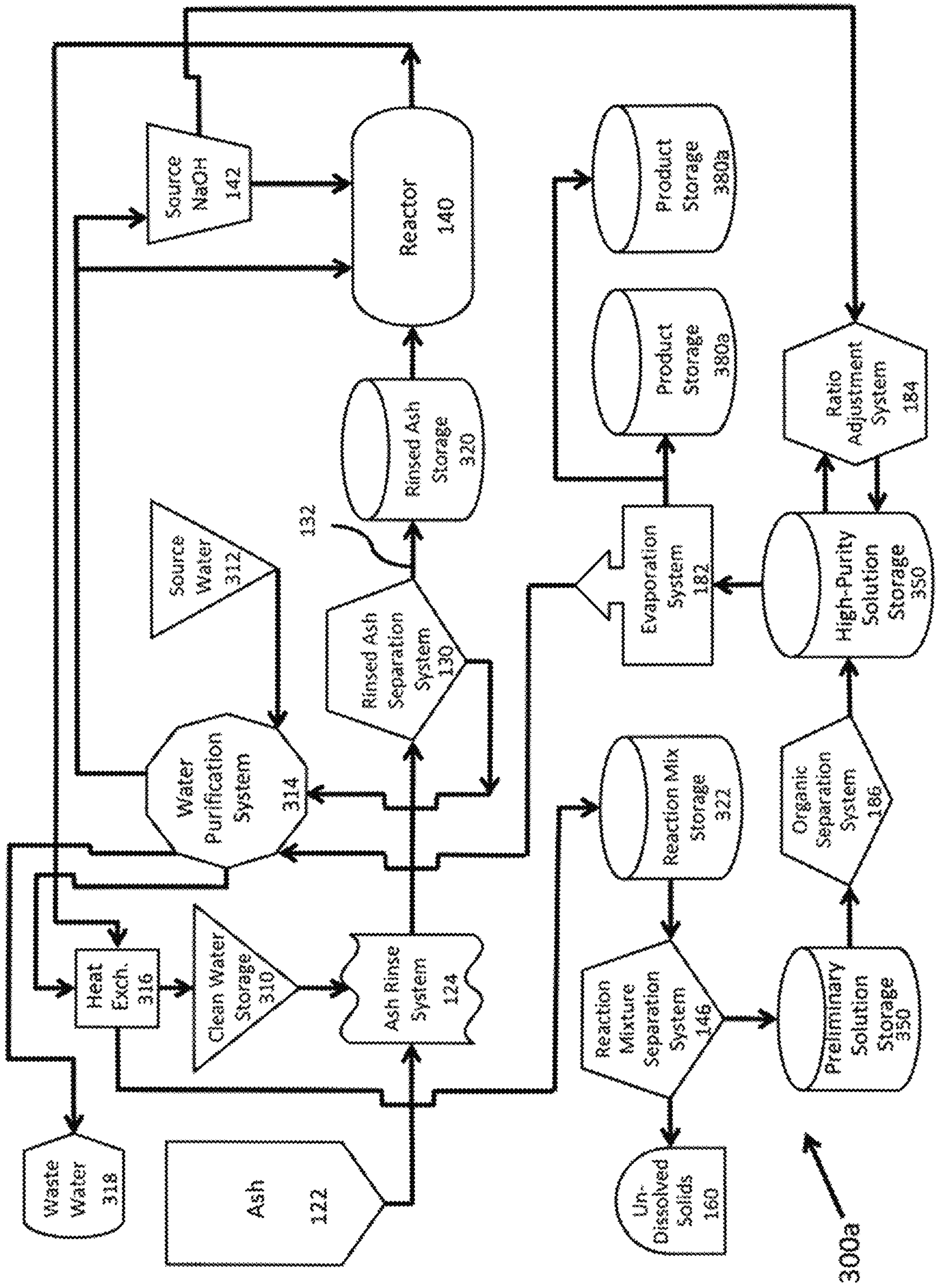
FIG. 3A is a schematic diagram, showing an exemplary embodiment of an ash processing system that may be employed for performing the exemplary process steps.
Figure 3B:
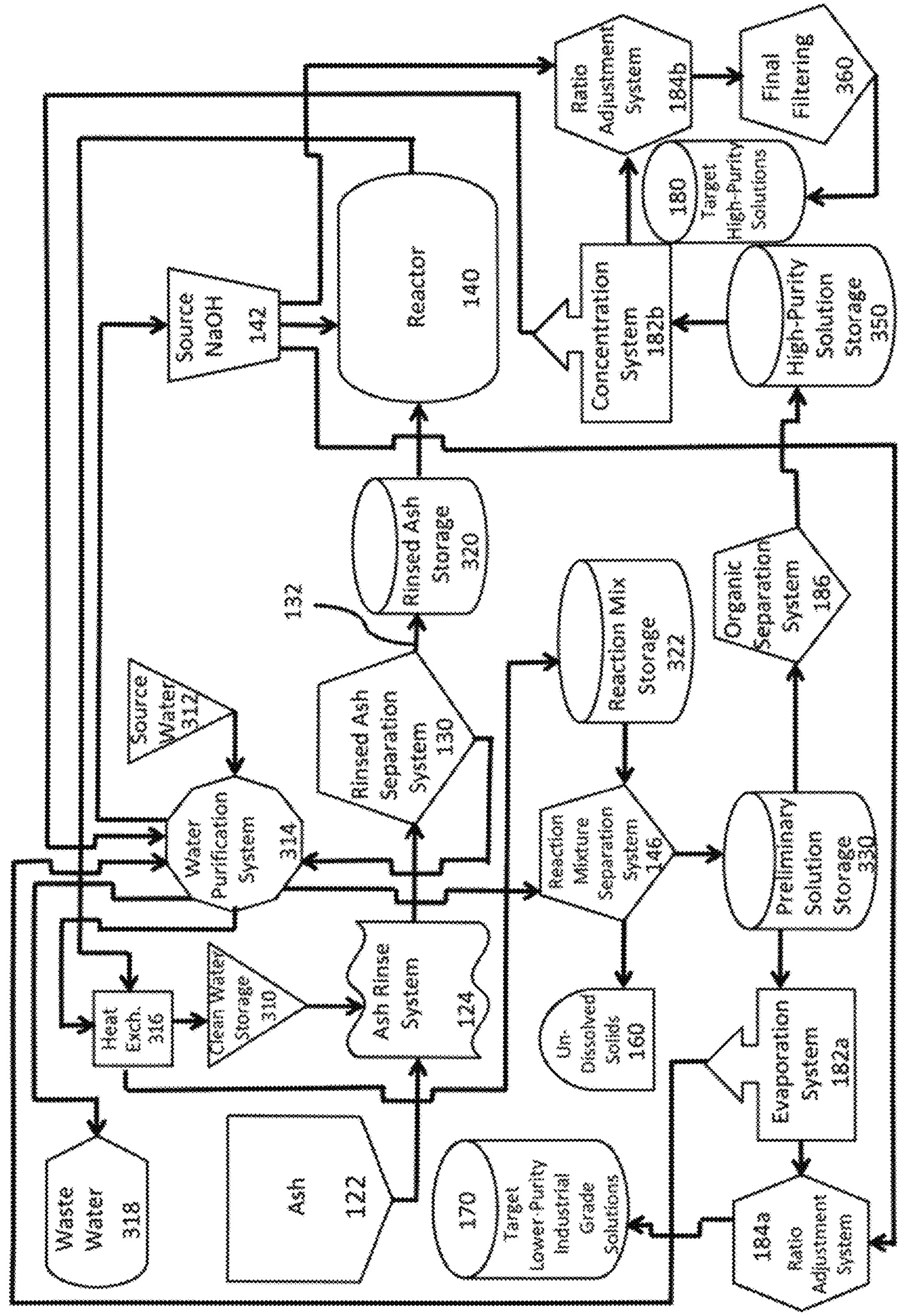
FIG. 3B is a schematic diagram, showing an exemplary alternative embodiment of an ash processing system that may be employed for performing the exemplary process steps.

FIGS. 1A and 1B (generically, FIG. 1) are schematic diagrams, showing alternative overviews of respective exemplary organic matter processing systems 100*a* and 100*b* (generically, 100) that may be employed for processing organic matter, such as rice hull ash, that contains amorphous silica. FIG. 2 is a flow diagram, showing some exemplary steps for an ash treatment process 200. FIGS. 3A and 3B (generically, FIG. 3) are schematic diagrams, showing alternative exemplary embodiments for ash processing system 120 in the form of ash processing systems 300*a* and 300*b* (generically, 300) that may be employed for performing the exemplary process steps.

With reference to FIG. 1, the organic processing system 100 may include a power production system 110 and an ash processing system 120. As previously discussed, organic matter 112 may be derived from monocotyledonous plants, such as rice hulls, that are high in amorphous silica. In some embodiments, the organic matter is chopped and/or ground to enhance combustion and yield.

In some embodiments, the organic matter 112 may be relatively unrinsed or unwashed or be pre-rinsed with a relatively pH-neutral solution or process before being fed to the boiler or furnace 114. For purposes of this disclosure, such organic matter 112 is considered to be "untreated" organic matter 112. In some embodiments, the relatively pH-neutral pre-rinse solution or process may have a pH greater than or equal to 6 and less than or equal to 8. In some embodiments, the relatively pH-neutral pre-rinse solution or process may have a pH greater than or equal to 6.5 and less than or equal to 7.5. In some embodiments, the relatively pH-neutral pre-rinse solution or process may have a pH greater than or equal to 6.7 and less than or equal to 7.2. In other words, in some embodiments, the organic matter 112 may be untreated by a pre-wash solution or process that has a pH less than or equal to 6 or a pH greater than or equal to 8. In some embodiments, the organic matter 112 may be untreated by a pre-wash solution or process that has a pH less than or equal to 6.5 or a pH greater than or equal to 7.5. In some embodiments, the organic matter 112 may be untreated by a pre-wash solution or process that has a pH less than or equal to 6.7 or a pH greater than or equal to 7.2.

In some embodiments, the organic matter 112 can be leached by pre-treatment with acids as disclosed in: "Production of High Purity Amorphous Silica from Rice Husk," Bakar et al., *Procedia Chemistry* 19 (2016) 189-195. However, pre-treatment of the organic matter 112 with acids, bases, or other chemical additives can be expensive and time-consuming and may require downstream treatments and expenses to compensate for factors introduced by such pre-treatments. The organic matter 112 from different sources may be pre-treated differently. In particular, there may be some downstream benefit for exposing different types of organic matter 112 to different types of rinses or pre-treatments, or for exposing organic matter 112 grown in different types of soils to different types of rinses or pre-treatments.

In many embodiments, the organic processing system 100 feeds the organic matter 112 to a boiler or furnace 114 for combustion that powers a turbine generator 116 to provide electricity to an external grid or for internal industrial use. The boiler or furnace 114 may additionally or alternatively be employed to generate heat that is employed for an internal industrial use. The power production system may optimize combustion temperatures for the production or energy or may restrict the combustion temperature range to facilitate preservation of certain forms of combustion products.

In some embodiments, the combustion process may be maintained at a temperature at less than or equal to 1000° C. In some embodiments, the combustion process may be maintained at a temperature at less than or equal to 850° C. In some embodiments, the combustion process may be maintained at a temperature at less than or equal to 750° C. In some embodiments, the combustion process may be maintained at a temperature at less than or equal to 725° C. In some embodiments, the combustion process may be maintained at a temperature at less than or equal to 700° C. In some embodiments, the combustion process may be maintained at a temperature at less than or equal to 695° C. In some embodiments, the combustion process may be maintained at a temperature at less than or equal to 690° C. In some embodiments, the combustion process may be maintained at a temperature at less than or equal to 680° C. In some embodiments, the combustion process may be maintained at a temperature at less than or equal to 675° C. In some embodiments, the combustion process may be maintained at a temperature at less than or equal to 650° C. In some embodiments, the combustion process may be maintained at a temperature at less than or equal to 600° C. In some embodiments, the combustion process may be maintained at a temperature that is greater than or equal to 600° C. In some embodiments, the combustion process may be maintained at a temperature that is greater than or equal to 650° C. In some embodiments, the combustion process may be maintained at a temperature that is greater than or equal to 675° C.

In some embodiments, the combustion process is conducted at or below a temperature that causes significant silica crystobalite formation. In some embodiments, the combustion process is conducted at or below a temperature that causes less than or equal to 10% silica crystobalite formation. In some embodiments, the combustion process is conducted at or below a temperature that causes less than or equal to 5% silica crystobalite formation. In some embodiments, the combustion process is conducted at or below a temperature that causes less than or equal to 2% silica crystobalite formation. In some embodiments, the combustion process is conducted at or below a temperature that causes less than or equal to 1% silica crystobalite formation. In some embodiments, the combustion process is conducted at or below a temperature that causes less than or equal to 0.5% silica crystobalite formation.

In some embodiments, the combustion process is conducted for longer duration than required for equivalent combustion processes at higher temperatures. As previously noted, temperatures greater than about 700° C. for any significant duration are more likely to create crystobalites. So, longer durations at temperatures below 700° C. may be desirable to combust more of the organic material at the lower temperatures.

With reference to FIGS. 1-3, the ash 122, such as rice hull ash, may be stored exteriorly or interiorly in a warehouse, bin, or other container, or the ash 122 may be directly or indirectly transported to the ash processing system 120 from the power production system 110. For example, a dry conveyor may transport the ash 122 (or the ash 122 may be mixed with a fluid and pumped) to the ash processing system 120 from the power production system 110. The ash processing system 120 may alternatively or additionally receive ash 122 from offsite facilities.

In some embodiments, the ash 122 can be treated with acids, bases, or other chemical additives. These treatments can provide some downstream benefits. However, such treatments are generally not cost effective and necessitate downstream treatments to remove the acids, bases, or other chemical additives.

In some embodiments, the ash 122 may be unwashed or untreated with acids, bases, or other chemical additives prior to a step 210 of contacting the ash 122 with clean water 123 as described below. For purposes of this disclosure, such ash 122 is considered to be "untreated" ash 122. For example, in some embodiments, the ash 122 may be untreated by a pre-wash solution or process that has a pH less than or equal to 6 or a pH greater than or equal to 8. In some embodiments, the ash 122 may be untreated by a pre-wash solution or process that has a pH less than or equal to 6.5 or a pH greater than or equal to 7.5. In some embodiments, the ash 122 may be untreated by a pre-wash solution or process that has a pH less than or equal to 6.7 or a pH greater than or equal to 7.2.

In some embodiments, extraction of amorphous silica from the ash 122 may begin with the step 210 of contacting the ash 122 with clean water 123 through use of an ash rinse system 124. The clean water 123 may be provided from a water source 312, which may be purified offsite, or which may be processed by a water purification system 314 and conveyed to a clean water storage 310, which may be a tank, vessel, or other type of container.

In some embodiments, the clean water 123 may be obtained directly from a well, spring, river, aquifer, reservoir, reclamation plant, desalinization plant, or other water source 312. Alternatively or additionally, the clean water 123 may include treated or untreated water from a municipality or other government entity. Depending on the quality of the clean water obtained from these water sources 312, the clean water 123 may or may not be further purified from its condition at the water soured 312, depending on the intended use for the clean water 123 and the intended quality for the product. For example, if multiple cleaning passes (or cycles) are employed, a less purified clean water condition (such as directly from the source or at any purity condition between that of the source and that of the purest water condition disclosed herein) may be used for an initial cleaning pass or early cleaning passes while a more (or most) purified clean water condition may be employed for one or more later or final cleaning passes.

In some embodiments, the clean water 123 may be the product of one or more water purification processes at the water purification system 314, including one or more of carbon filtering, capacitive deionization, distillation, electrodeionization, microfiltration, reverse osmosis, ultrafiltration, or ultraviolet oxidation.

In general, the clean water 123 has a lower percentage of metallic impurities than the ash 122, has a relatively neutral pH (with consideration of absorbed $CO_2$), and has a total organic content (TOC) that is equivalent to less than approximately 10 ppm.

In some embodiments, the relatively pH-neutral clean water 123 may have a pH greater than or equal to 6 and less than or equal to 8. In some embodiments, the relatively pH-neutral clean water 123 may have a pH greater than or equal to 6.5 and less than or equal to 7.5. In some embodiments, the relatively pH-neutral clean water 123 may have a pH greater than or equal to 6.7 and less than or equal to 7.2. In other words, in some embodiments, the ash 122 may be untreated by a cleaning solution or process that has a pH less than or equal to 6 or a pH greater than or equal to 8. In some embodiments, the ash 122 may be untreated by a cleaning solution or process that has a pH less than or equal to 6.5 or pH greater than or equal to 7.5. In some embodiments, the ash 122 may be untreated by a cleaning solution or process that has a pH less than or equal to 6.7 or a pH greater than or equal to 7.2.

In some embodiments, the clean water 123 has less than or equal to: 10 ppm chloride ion, 5 ppm calcium, 5 ppm sulfate ion, 7.5 ppm aluminum, 5 ppm iron, and 1 ppm titanium. In some embodiments, the clean water 123 has less than or equal to: 1 ppm chloride ion, 0.5 ppm calcium, 0.5 ppm sulfate ion, 0.75 ppm aluminum, 0.5 ppm iron, and 0.1 ppm titanium. In some embodiments, the clean water 123 has less than or equal to: 100 ppb chloride ion, 50 ppb calcium, 50 ppb sulfate ion, 75 ppb aluminum, 50 ppb iron, and 10 ppb titanium.

In some embodiments, the clean water 123 meets the minimum criteria for Pharmacopeia USP with resistivity>0.77 MΩ-cm, conductivity<1.3 μS/cm at 25° C., and TOC<500 (μg C/L, ppb). In some embodiments, the clean water 123 meets the minimum criteria for NCCLS Type II with resistivity>1 MΩ-cm, conductivity<1 μS/cm at 25° C., and TOC<200 ppb. In some embodiments, the clean water 123 meets the minimum criteria for ASTM (D1193-91) Type III with resistivity>0.05 MΩ-cm, conductivity<0.25 μS/cm at 25° C., and TOC<200 ppb or μg/L.

The ash rinse system 124 can employ any style of rinsing, washing, and/or mixing equipment. The ash rinse system 124 can be as simple as a pressure washer that aims the clean water 123 at the ash 122 on a conveyor, such as a belt filter with a sieve (which would be part of a separation system 130). The direction of water flow could be at any angle, such as perpendicular to the belt filter or any flow angle that counter to the primary direction of travel of the belt filter, such as perpendicular to the direction of travel.

Alternatively, the contacting step 210 can be performed in an open or closed vessel or chamber. Such chamber or vessel can be shaken, rocked, or spun, or such chamber can be equipped with an internal mixing apparatus, such as a paddle stirrer, blender, stir bars, or other mechanical stirring device. In some embodiments, the ash rinse system 124 may include sonication equipment as part of the contacting step 210 or as a discrete system or process.

The contacting step 210 may employ a single pass of clean water 123 or multiple passes of clean water 123. For example, in some embodiments, at least three passes are employed. In some embodiments, at least five passes are employed. In some embodiments, the number of passes may be based on desired characteristics of the rinsed ash leaving the rinsed ash separation system 130 that performs a step 220 of separating rinsed ash from contaminated rinse water.

In some embodiments, the ash 122 is rinsed (the rinse passes are continued) until the rinsed ash has obtained a conductivity that is less than or equal to a desired value. Conductivity can be a good indicator of the amount of chlorides or other contaminants in the rinsed ash. In some embodiments, the desired conductivity of the rinsed ash is less than or equal to 250 microsiemens (μS) measured from 10 grams (g) of dry weight of rinsed ash in 50 milliliter (mL) of DI clean water 123. In some embodiments, the desired conductivity of the rinsed ash is less than or equal to 150 μS measured from 10 g of dry weight of rinsed ash in 50 mL of DI clean water 123. In some embodiments, the desired conductivity of the rinsed ash is less than or equal to 125 μS measured from 10 g of dry weight of rinsed ash in 50 mL of DI clean water 123. In some embodiments, the desired conductivity of the rinsed ash is less than or equal to 100 μS measured from 10 g of dry weight of rinsed ash in 50 mL of DI clean water 123. In some embodiments, the desired conductivity of the rinsed ash is less than or equal to 90 μS measured from 10 g of dry weight of rinsed ash in 50 mL of DI clean water 123.

In some embodiments, the ash 122 is rinsed (the rinse passes are continued) until the contaminated rinse water has obtained a conductivity that is less than or equal to a desired value. In some embodiments, the desired conductivity of the contaminated rinse water is less than or equal to 250 microsiemens (μS). In some embodiments, the desired conductivity of the contaminated rinse water is less than or equal to 150 μS. In some embodiments, the desired conductivity of the contaminated rinse water is less than or equal to 125 μS. In some embodiments, the desired conductivity of the contaminated rinse water is less than or equal to 100 μS. In some embodiments, the desired conductivity of the contaminated rinse water is less than or equal to 90 μS.

Alternatively, the contacting step 210 may employ a continuous stream of clean water 123, and may employ only a single pass. For example, the contacting step 210 may employ a counter flow rinsing process. In such a counter flow process, the ash 122 has movement in a first direction and at least some of the clean water 123 is introduced in a second direction that is opposite or transverse to the first direction. In some embodiments, the ash 122 may be introduced at the top of a container while water is introduced at the bottom of the container. In some embodiments, the container may be a pipe, such as a vertical pipe or a sloped pipe. The parameters of the contacting step 210 and the components of the ash rinse system 124 (in cooperation with the parameters of a rinse separation step 220 and components of the rinsed ash separation system 130) may be adapted to obtain rinsed ash at or below the desired conductivity. For example, the length and diameter of the pipe or other container, the slope of the pipe, the volume, force, and/or heat of water, and the pore size and surface area of the sieve may be coordinated with the amount and density of the ash 122.

In some embodiments, the contacting step 210 employs a minimum of 2 liters (l) of the clean water 123 per kilogram (kg) of the ash 122. In some embodiments, the contacting step 210 employs a minimum of 5 l/kg of the ash 122. In some embodiments, the contacting step 210 employs a minimum of 7 l/kg of the ash 122. In some embodiments, the contacting step 210 employs from 7.5-15 l/kg of the ash 122. In some embodiments, the contacting step 210 employs less than 50 liters of the clean water 123 per kilogram of the ash 122. In some embodiments, the contacting step 210 employs less than 25 l/kg of the ash 122. In some embodiments, the contacting step 210 employs less than 15 l/kg of the ash 122. In some embodiments, the contacting step 210 employs less than 10 l/kg of the ash 122. These values designate the total amount of the clean water 123 per kilogram of the ash 122 used regardless of the number of passes. However, in some embodiments, the amount the clean water 123 per kilogram of the ash 122 indicated by these values may be used in single pass or in each of multiple passes.

In some embodiments, the ash rinse system 124, or the clean water 123 that is introduced, is heated to (and/or maintained at) a rinse temperature that is greater than or equal to 15° C. The rinse temperature may be greater than or equal to 20° C. The rinse temperature may be greater than or equal to 25° C. The rinse temperature may be greater than or equal to 30° C. The rinse temperature may be greater than or equal to 50° C. The rinse temperature may be greater than or equal to 75° C. The rinse temperature may be greater than or equal to 90° C. The rinse temperature may be greater than or equal to 95° C. The rinse temperature may be less than or equal to 200° C. The rinse temperature may be less than or equal to 150° C. The rinse temperature may be less than or equal to 150° C. The rinse temperature may be less than or equal to 100° C. The rinse temperature may be less than or equal to 75° C. The rinse temperature may be less than or equal to 50° C. The rinse temperature may be less than or equal to 40° C. The rinse temperature may be less than or equal to 35° C. The rinse temperature may be in any combination of ranges of these temperature end points. For example, the rinse temperature may greater than or equal to 15° C. and less than or equal to 75° C., or greater than or equal to 15° C. and less than or equal to 50° C. In some embodiments, the rinse temperature may greater than or equal to 25° C. and less than or equal to 75° C., or greater than or equal to 25° C. and less than or equal to 50° C. In some embodiments, warmer temperatures below boiling are preferred. Skilled person will appreciate that clean water 123 may be presented as steam, but that use of steam might utilize different equipment and considerations than utilized for clean water 123 in a liquid state.

In some embodiments, the clean water 123 is heated to within a few degrees of the desired rinse temperature. The clean water 123 may be heated directly by combustion or another energy source, or the clean water 123 may be heated through a heat exchange system 316. For example, the clean water 123 may derive heat directly or indirectly from the boiler 114 or from heat exchange with hot reactor products that are later described. In some embodiments, the clean water 123 may be heated by as much as 70° C. in the heat exchanger, such as from about ° C. to over 90° C.

The ash rinse system 124 may employ elevated pressures to move the clean water 123 through the ash 122 and/or through the rinsed ash separation system 130. In some embodiments, the clean water is supplied at a pressure of greater than or equal to 1 barg. In some embodiments, the clean water is supplied at a pressure of greater than or equal to 2 barg. In some embodiments, the clean water is supplied at a pressure of greater than or equal to 3 barg. In some embodiments, the clean water is supplied at a pressure of greater than or equal to 4 barg. In some embodiments, the clean water is supplied at a pressure of less than or equal to 4 barg.

In some embodiments, the rinsed ash separation system 130 can be integrated with and form part of the ash rinse system 124. For example, the rinsing and separation can be conducted in a stir tank with a filter. In some embodiments, a reactor 140 employed for a subsequent step can be integrated with and form part of the rinsed ash separation system 130 and/or the ash rinse system 124. For example, the rinsing and separation can be conducted in the reactor 140.

In some embodiments, the rinsed ash separation system 130 is distinct from and/or spatially separated from the ash rinse system 124. In some embodiments, the ash rinse system 124 feeds, via conveyor or other transport mechanism, the rinsed ash separation system 130 that performs a step 220 of separating rinsed ash from contaminated rinse water.

In some embodiments, the rinsed ash separation system 130 may include one or more of filters, centrifugal filters, or industrial scale belt filters.

In some embodiments, the rinsed ash separation system 130 may retain solids greater than 1 micron. In some embodiments, the rinsed ash separation system 130 may retain solids greater than 2 microns. In some embodiments, the rinsed ash separation system 130 may retain solids greater than 5 microns. In some embodiments, the rinsed ash separation system 130 may retain solids greater than 10 microns.

In some embodiments, the rinsed ash separation system 130 may discard solids less than 10 microns. In some embodiments, the rinsed ash separation system 130 may discard solids less than 5 microns. In some embodiments, the rinsed ash separation system 130 may discard solids less than 2 microns. In some embodiments, the rinsed ash separation system 130 may discard solids less than 1 micron.

In some embodiments, the size of solids retained may be selected to discard fine ash with chlorides and sulfates at the expense of some silicates. For example, in some embodiments, the rinsed ash separation system 130 may retain solids greater than or equal to 300 microns or discard solids less than or equal to 300 microns. In some embodiments, the rinsed ash separation system 130 may retain solids greater than or equal to 200 microns or discard solids less than or equal to 200 microns. In some embodiments, the rinsed ash separation system 130 may retain solids greater than or equal to 100 microns or discard solids less than or equal to 100 microns.

When fine particulate filtering is reduced, flow volume through the filter(s) can be increased and filters can be replaced less frequently. When the selected filter grade permits fine ash, such as smaller than 300 microns, to pass, the loss of ash containing silicate can be as much as 10%. In such embodiments, the contaminated rinse water containing such fine ash particulates (and impurities) can be passed through a secondary rinsed ash separation system (not shown). In some embodiments, the secondary rinsed ash separation system employs a path (not shown) between the primary rinsed ash separation system 130 and the rinsed ash storage 130 or the reactor 140 that is distinct from a primary path 132 between the primary rinsed ash separation system 130 and the rinsed ash storage 130 or the reactor 140. If the primary rinsed ash separation system 130 permits the fine ash to flow through, then the previously mentioned smaller solid retention and discard values could apply to the secondary rinsed ash separation system.

Regardless of whether the contaminated rinse water includes the fine ash particulates previously mentioned, the contaminated rinse water contains chlorides, sulfates, and other water-soluble contaminants. These contaminants may also include metallic impurities, such as at least one of more of calcium, iron, manganese, magnesium, potassium, and sodium. The contaminated rinse water may be directed to the water purification system 314 to remove these contaminants, which may be collected for separation or may be discarded. In some embodiments, lightly contaminated rinse water from a later or final pass of the clean water 123 through the ash rinse system 124 may bypass the water purification system 314, or may undergo minimal purification, before such lightly contaminated rinse water is reused for a first or early cleaning pass on a new batch of the ash 122. Highly contaminated rinse water or water used to clean or flush the water purification system 314 may be directed as waste water 318 to a waste water treatment system (not shown).

One may appreciate that certain components of the water purification system 314 may be adversely affected by used water that contains silicates. Such used water may be pretreated to reduce the silicate concentration before being sent to the more sensitive components of the water purification system 314, or such used water may be shunted to applications that do not require silicate elimination and/or the highest purity, or such water may be sent for treatment as waste water 318.

In some embodiments, the lightly contaminated rinse water contains less than 25% more impurities than the initial clean water 123. In some embodiments, the lightly contaminated rinse water contains less than 15% more impurities than the initial clean water 123. In some embodiments, the lightly contaminated rinse water contains less than 10% more impurities than the initial clean water 123. In some embodiments, the lightly contaminated rinse water contains less than 5% more impurities than the initial clean water 123.

In some embodiments, exemplary contaminated rinse water may contain greater than or equal to 1240 mg/l chloride, 464 mg/l sulfate, 152 mg/l hydrogen carbonate, 9 mg/l carbonate, 0.2 mg/l fluoride, 17 mg/l bromine, 80.2 mg/l silicon dioxide, 1 mg/l boron, 0.12 mg/l barium, 12 mg/l calcium, 470 mg/l potassium, 16 mg/l magnesium, 78 mg/l sodium, 0.55 mg/l iron, 0.13 mg/l ammonium, 0.32 mg/l nitrate, 250 mg/l phosphate, and 1 mg/l free carbon dioxide.

In some embodiments, the rinse product departs the rinse separation system 130 as a moist cake or slurry that contains greater than or equal to 70% water by weight. In some embodiments, the rinse product contains greater than or equal to 80% water by weight. In some embodiments, the rinse product contains greater than or equal to 90% water by weight. In some embodiments, the rinse product contains greater than or equal to 92% water by weight. In some embodiments, the rinse product contains less than or equal to 25% rinsed ash by weight. In some embodiments, the rinse product contains less than or equal to 15% rinsed ash by weight. In some embodiments, the rinse product contains less than or equal to 10% rinsed ash by weight. In some embodiments, the rinse product contains less than or equal to 8% rinsed ash by weight.

The rinse product includes the rinsed ash (which includes amorphous silica), undissolved solids and insoluble contaminants, such as sparingly soluble salts.

The rinse product can be conveyed, pumped, or otherwise transported to a rinsed ash storage 320, or the rinse product can be sent directly to a reactor 140. The rinse product can be diluted or concentrated at the rinsed ash storage 320 or before reaching it. For example, the rinsed ash storage 320 may serve as an evaporator to reduce the water content of the rinse product.

In some embodiments, the contents of the rinsed ash storage 320 are constantly stirred or otherwise constantly agitated. In some embodiments, the contents of the rinsed ash storage 320 are continuously stirred or otherwise continuously agitated.

In some embodiments, the temperature of the contents of the rinsed ash storage 320 may be uncontrolled and allowed to be at (or moving toward) ambient temperature. However, although the ash treatment process 200 is not wedded to a particular temperature for storage of the rinse product, the temperature of the rinsed ash storage 320 can be controlled. The ash treatment process 200 may realize some cost savings by maintaining or enhancing the temperature (such as the rinse water temperature) of the rinse product that leaves the rinsed ash separation system 130. For example, maintaining the rinse product at a temperature above the ambient temperature may facilitate stirring or other forms of agitation, thereby saving cost on the stirring equipment or saving energy cost of the stirring. Additionally, because the rinsed ash product will be heated during a subsequent reaction step, some thermal cost benefit may be obtained by maintaining an elevated temperature versus re-heating the rinsed ash product from an ambient temperature.

In some embodiments, the contents (rinse product diluted, concentrated, or as is) of the rinsed ash storage 320 can be maintained at a temperature above freezing. In some embodiments, if any heat is applied, the contents of the rinsed ash storage 320 can be maintained at a temperature greater than or equal to 40° C. In other embodiments, the contents of the rinsed ash storage 320 are maintained at a temperature greater than or equal to 60° C., greater than or equal to 75° C., greater than or equal to 85° C., or greater than or equal to 90° C. In some embodiments, the contents of the rinsed ash storage 320 can be maintained at a temperature less than or equal to 150° C., less than or equal to 125° C., or less than or equal to 100° C. In some embodiments, the contents of the rinsed ash storage 320 are maintained at a temperature lower than or equal to the boiling point of the rinse product.

In some embodiments, a predetermined amount of the rinse product (diluted, concentrated, or as is) and predetermined amount of sodium oxide ($Na_2O$) are loaded into the reaction chamber or reactor 140. The reactor 140 may include one or more of a batch reactor, continuous stirred-tank reactor (CSTR), plug flow reactor (PFR) or continuous tubular reactor (CTR) or piston flow reactor (PFR), semi-batch reactor, trickle-bed reactor, or micro-reactor. In some embodiments, the reactor 140 can serve as a container of the ash rinse system 124 and/or also serve all of the function of the rinsed ash storage 320. The reactor 140 may include a reaction chamber that can be sealed and heated. In some embodiments, a 2-inch thick stainless steel reaction vessel is employed.

The sodium oxide may be pumped, conveyed, or otherwise transported from a sodium oxide source 142. The sodium oxide may be in solid form or may be in an aqueous solution or in solution of some other solvent. For example, the sodium oxide may be supplied in the form of sodium hydroxide. The concentration of the rinsed ash and/or sodium oxide may be adjusted to provide a desired relative concentration for a reaction to convert the amorphous silica in the rinsed ash to sodium silicate. The reaction can be presented as the following equation:

$$2NaOH + SiO_2 \xrightarrow{t^\circ C.} Na_2SiO_3 + H_2O.$$

In some embodiments, the amount of sodium oxide added is determined by amount of silica added. For such embodiments, the percentage of silica by weight (or dry weight) in the ash 122 is useful information. In some embodiments, enough sodium oxide is added to provide silicate having a post-reaction ratio R that is higher than target ratio R. (The target ratio R can be adjusted by adding sodium hydroxide at the final adjustment step.) In some embodiments, the excess sodium oxide added for the reaction is less than or equal to 10% by weight. In some embodiments, the excess sodium oxide added for the reaction is less than or equal to 5% by weight. In some embodiments, the excess sodium oxide added is less than or equal to 2% by weight. In some embodiments, the excess sodium oxide added is less than or equal to 1% by weight. In some embodiments, the excess sodium oxide added is less than or equal to 0.5% by weight. In some embodiments, the excess sodium oxide added is less than or equal to 0.1% by weight.

In some embodiments, the excess sodium oxide added is greater than or equal to 0.1% by weight. In some embodiments, the excess sodium oxide added is greater than or equal to 0.5% by weight. In some embodiments, the excess sodium oxide added is greater than or equal to 1% by weight. In some embodiments, the excess sodium oxide added is greater than or equal to 2% by weight. In some embodiments, the excess sodium oxide added for the reaction is greater than or equal to 5% by weight. In some embodiments, the excess sodium oxide added for the reaction is greater than or equal to 10% by weight.

In some embodiments, small-scale batch reactions utilize as little as 2.5 kg of combusted organic material, such as rice hull ash. In some embodiments, small-scale batch reactions utilize as little as 0.1 kg of combusted organic material, such as rice hull ash.

In some embodiments, batch reactions utilize greater than or equal to 3 kg of combusted organic material, such as rice hull ash. In some embodiments, batch reactions utilize greater than or equal to 10 kg of combusted organic material, such as rice hull ash. In some embodiments, batch reactions utilize greater than or equal to 20 kg of combusted organic material, such as rice hull ash. In some embodiments, batch reactions utilize greater than or equal to 30 kg of combusted organic material, such as rice hull ash. In some embodiments, batch reactions utilize greater than or equal to 500 kg of combusted organic material, such as rice hull ash. In some embodiments, batch reactions utilize greater than or equal to 2,000 kg of combusted organic material, such as rice hull ash. In some embodiments, batch reactions utilize greater than or equal to 2,500 kg of combusted organic material, such as rice hull ash.

Similarly, in some embodiments, a small batch system might employ a reactor 140 having a capacity as little as 50 liters. In some embodiments, a batch system might employ a reactor 140 having a capacity greater than 50 liters. In some embodiments, a batch system might employ a reactor 140 having a capacity greater than or equal to 25,000 liters. In some embodiments, a batch system might employ a reactor 140 having a capacity greater than or equal to 30,000 liters.

The reactor 140 is sealed and then heated to convert the solid, amorphous silica in the rinsed ash to sodium silicate, as indicated by a process step 230. In some embodiments, the reactor 140 or reactants are heated to a reaction temperature that is greater than or equal to 90° C. In some embodiments, the reaction temperature is greater than or equal to 100° C. In some embodiments, the reaction temperature is greater than or equal to 120° C. In some embodiments, the reaction temperature is greater than or equal to 150° C. In some embodiments, the reaction temperature is greater than or equal to 160° C. In some embodiments, the reactor 140 or reactants are heated to a reaction temperature that is less than or equal to 200° C. In some embodiments, the reaction temperature is less than or equal to 175° C. In some embodiments, the reactor 140 or reactants are heated to a reaction temperature that is greater than or equal to 90° C. and less than or equal to 200° C. In some embodiments, the reaction temperature is greater than or equal to 120° C. and less than or equal to 175° C. In some embodiments, the reaction temperature is greater than or equal to 120° C. and less than or equal to 160° C. In some embodiments, the reaction temperature is greater than or equal to 150° C. and less than or equal to 160° C.

One will appreciate that higher temperatures can provide greater conversion to sodium silicate facilitate shorter batch times. The higher temperatures may be achieved by employing higher pressures. One will, however, appreciate, that utilizing higher temperatures tend to increase costs. While the lower temperatures, such as less than 100° C. can be used, such processing may entail longer batch times, which can adversely affect throughput. Nevertheless, if the ash 122 is abundant and inexpensive relative to heating costs, the reaction can be performed with excess ash 122 at the lower temperatures.

In some embodiments, the reactor 140 is brought to an internal reaction pressure that is greater than 100,000 pascals (1 bar). In some embodiments, the reactor 140 is brought to an internal reaction pressure that is greater than or equal to 120,000 pascals (1.2 bars). (Pressure=1 bar at T<100 C.) In some embodiments, the reaction pressure is greater than or equal to 200,000 pascals (2 bars). In some embodiments, the reaction pressure is greater than or equal to 300,000 pascals (3 bars). In some embodiments, the reaction pressure is greater than or equal to 400,000 pascals (4 bars). In some embodiments, the reaction pressure is greater than or equal to 500,000 pascals (5 bars). In some embodiments, the reaction pressure is greater than or equal to 700,000 pascals (7 bars). In some embodiments, the reactor 140 is brought to an internal reaction pressure that is less than or equal to 700,000 pascals. In some embodiments, the reactor 140 is brought to an internal reaction pressure that is greater than 120,000 pascals and less than or equal to 500,000 pascals. In some embodiments, the reactor 140 is brought to an internal reaction pressure that is greater than 150,000 pascals (1.5 bars) and less than or equal to 300,000 pascals.

In some embodiments, the reaction temperature and/or reaction pressure within the reactor 140 is maintained for greater than or equal to 1 hour. In some embodiments, the reaction temperature and/or reaction pressure is maintained for greater than or equal to 1.5 hours. In some embodiments, the reaction temperature and/or reaction pressure is maintained for greater than or equal to 3 hours. In some embodiments, the reaction temperature and/or reaction pressure is maintained for shorter than or equal to 2 hours.

In some embodiments, the reaction parameters are established to provide a reactor conversion efficiency of amorphous silica to sodium silicate that is greater than or equal to 75%. In some embodiments, the reaction parameters are established to provide a reactor conversion efficiency that is greater than or equal to 80%. In some embodiments, the reaction parameters are established to provide a reactor conversion efficiency that is greater than or equal to 82%. In some embodiments, the reaction parameters are established to provide a reactor conversion efficiency that is greater than or equal to 85%. In some embodiments, the reaction parameters are established to provide a reactor conversion efficiency that is greater than or equal to 88%. In some embodiments, the reaction parameters are established to provide a reactor conversion efficiency that is greater than or equal to 90%.

In many embodiments electrical types of heating may be employed to heat the contents of the reactor 140, especially for smaller batch sizes. One will appreciate that steam can be employed to heat the contents of the reactor 140, especially for larger batch sizes.

After the reaction is maintained for a desired period of time, the reactor 140 and its post-reaction mixture may be permitted to cool and/or reduce the pressure in the reactor 140 before the reaction mixture (also referred to as reaction product) is removed from the reactor 140.

In some embodiments, the reactor 140 and/or its post-reaction mixture are actively cooled, or permitted to cool under ambient conditions, to a temperature that is less than or equal to 150° C. In some embodiments, the reactor 140 and/or its post-reaction mixture are cooled to a temperature that is less than or equal to 125° C. In some embodiments, the reactor 140 and/or its post-reaction mixture are cooled to a temperature that is less than or equal to 100° C. In some embodiments, the reactor 140 and/or its post-reaction mixture are cooled to a temperature that is less than or equal to 90° C. In some embodiments, the reactor 140 and/or its post-reaction mixture are cooled to a temperature that is greater than or equal to 50° C. In some embodiments, the reactor 140 and/or its post-reaction mixture are cooled to a temperature that is less than or equal to 60° C. In some embodiments, the reactor 140 and/or its post-reaction mixture are cooled to a temperature that is less than or equal to 75° C. In some embodiments, the reactor 140 and/or its post-reaction mixture are cooled to a temperature that is less than or equal to 85° C. In some embodiments, the reactor 140 and/or its post-reaction mixture are cooled to a temperature that is less than or equal to 90° C.

In some embodiments, a desired post-reaction temperature may be reduced by reducing or shutting off the heat to the reactor 140 and waiting until the reaction mixture or reactor 140 reaches a desired lower temperature. In some embodiments, a desired post-reaction temperature may be reached by actively cooling the reaction mixture or reactor 140. In some embodiments, a desired post-reaction temperature may be reached by reducing the pressure in the reactor 140 to reach a desired lower temperature.

In some embodiments, the reactor 140 is brought to an internal post-reaction pressure that is less than or equal to 150,000 pascals. In some embodiments, the reactor 140 is brought to an internal post-reaction pressure that is less than or equal to 120,000 pascals. In some embodiments, the reactor 140 is brought to an internal post-reaction pressure that is equal to or greater than 100,000 pascals.

Alternatively, some of all of the pressure accumulated within the reactor 140 may be utilized to push the post-reaction mixture through the heat exchanger 316 to a post-reaction mixture storage 322 or a reaction mixture separation system 146. The pressure can be reduced to useable amounts of pressure by the appropriate use of valves. Any excess heat can be reduced by exchange or active or ambient cooling. For example, the heat exchange system 316 may reduce the temperature of the post-reaction mixture from the reaction temperature to about 50° C. An off-the-shelf heat exchange system may be employed.

The post-reaction mixture may be pumped, conveyed, or otherwise transported to, and stored in, the post-reaction mixture storage 322 before being fed to the reaction mixture separation system 146. The post-reaction mixture storage 322 may be a tank, vessel, or other type of container. In some embodiments, the contents of the post-reaction mixture storage 322 can be constantly stirred or otherwise constantly agitated. In some embodiments, the contents of the post-reaction mixture storage 322 can be continuously stirred or otherwise continuously agitated.

In some embodiments, the contents of the post-reaction mixture storage 322 are maintained at a temperature lower than or equal to the boiling point of the post-reaction mixture. In some embodiments, the contents of the post-reaction mixture storage 322 are maintained at a temperature greater than or equal to 50° C. In some embodiments, the contents of the post-reaction mixture storage 322 are maintained at a temperature greater than or equal to 60° C. In some embodiments, the contents of the post-reaction mixture storage 322 are maintained at a temperature greater than or equal to 75° C. In some embodiments, the contents of the post-reaction mixture storage 322 are maintained at a temperature greater than or equal to 85° C. In some embodiments, the contents of the post-reaction mixture storage 322 are maintained at a temperature greater than or equal to 90° C. In some embodiments, the contents of the post-reaction mixture storage 322 are maintained at a temperature less than or equal to 150° C. In some embodiments, the contents of the post-reaction mixture storage 322 are maintained at a temperature less than or equal to 125° C. In some embodiments, the contents of the post-reaction mixture storage 322 are maintained at a temperature less than or equal to 100° C.

In some embodiments, the post-reaction mixture can be referred to as a pressure-cooked reaction mixture. In some embodiments, the post-reaction mixture contains a liquid sodium silicate, soluble contaminants, undissolved solids 160, and soluble and insoluble contaminants. The undissolved solids 160 can include some, or all of the undissolved solids present in the rinse product, as well as different compounds generated or freed during the heating step 230 in the reactor 140.

In some embodiments, the undissolved solids include insoluble organic molecules, unreacted silica, and/or insoluble contaminants. In some embodiments, the insoluble contaminants include sparingly soluble salts, such as calcium hydroxide ($Ca(OH)_2$), magnesium oxide (MgO), and/or iron oxide ($Fe_2O_3$, $Fe_3O_4$). In some embodiments, the soluble contaminants include soluble organic molecules, soluble salts and ionic species, and sparingly soluble salts, such as those listed above. In some embodiments, the soluble organic molecules include soluble lignins. In some embodiments, the soluble organic molecules include 5-hydroxymethylfurfural (HMF). In some embodiments, the soluble salts and ionic species include low levels of chlorides, sulfates, and/or metallic impurities, such as at least one of more of calcium, iron, manganese, magnesium, potassium, and sodium.

The undissolved solids 160 can be conveyed or otherwise transported to storage for waste disposal or for use in other industrial processes. Some industrial processes for utilizing a post-reaction carbon cake are disclosed in U.S. Pat. No. 6,375,735 and other patents of Agritec Inc., even though the carbon cakes would contain different percentages and compositions because the Agritec, Inc. reaction conditions are different.

As previously noted, the post-reaction mixture may be stored in the post-reaction mixture storage 322 before being fed to the reaction mixture separation system 146 (also referred to as the post-reaction separation system 146). In many embodiments, in a process step 240, the reaction mixture separation system 146 generally separates a preliminary sodium silicate solution 150, including the soluble components of the post-reaction mixture, from the undissolved solids 160 and insoluble contaminants. In some embodiments, the reaction mixture separation system 146 may include a first post-reaction filter media and/or a mechanical device that collects the undissolved solids, typically in the form of a "carbon cake."

In some embodiments, the mechanical filtration device employs centrifugal force to separating the solids from the liquid. In some embodiments, the mechanical filtration device employs other types mechanical separators, such as a decanter system. In some embodiments, the reaction mixture separation system 146 employs a filter press or a pressure filter. In some embodiments, the first post-reaction filter media (which may be used in conjunction with a filter press or pressure filter) employs a screen or fabric mesh.

The initial carbon cake may contain a substantial amount of soluble sodium silicate. In some embodiments, the initial carbon cake contains greater than or equal to 25% solids to sodium silicate solution. In some embodiments, the initial carbon cake contains greater than or equal to 30% solids to sodium silicate solution. In some embodiments, the initial carbon cake contains greater than or equal to 35% solids to sodium silicate solution. In some embodiments, the initial carbon cake contains greater than or equal to 39% solids to sodium silicate solution.

In some embodiments, the initial filter cake can be rinsed with water to capture more of the sodium silicate solution. The water is preferably clean water 123, such as described previously, which may be provided within the clean water temperature ranges, such as described previously, although steam could be alternatively employed.

In some embodiments, the rinsed carbon cake contains greater than or equal to 35% solids to sodium silicate. In some embodiments, the rinsed carbon cake contains greater than or equal to 39% solids to sodium silicate. In some embodiments, the rinsed carbon cake contains greater than or equal to 40% solids to sodium silicate. In some embodiments, the rinsed carbon cake contains greater than or equal to 45% solids to sodium silicate. In some embodiments, the rinsed carbon cake contains greater than or equal to 50% solids to sodium silicate. In some embodiments, the rinsed carbon cake contains greater than or equal to 60% solids to sodium silicate. In some embodiments, the rinsed carbon cake contains greater than or equal to 70% solids to sodium silicate. In some embodiments, the rinsed carbon cake contains greater than or equal to 80% solids to sodium silicate. In some embodiments, the rinsed carbon cake contains greater than or equal to 90% solids to sodium silicate.

In some embodiments, the first post-reaction filter media that has a pore size of less than or equal to 2 microns. In some embodiments, the first post-reaction filter media that has a pore size of less than or equal to 1 micron. In some embodiments, the first post-reaction filter media that has a pore size of less than or equal to 0.5 microns. In some embodiments, the first post-reaction filter media that has a pore size of less than or equal to 0.1 micron.

In some embodiments, the reaction mixture separation system 146 employs a pressure differential greater than 20,000 pascals across the first post-reaction filter media to separate the preliminary sodium silicate solution 150 from at least some of the undissolved solids 160. In some embodiments, the reaction mixture separation system 146 employs a pressure differential greater than 35,000 pascals to separate the preliminary sodium silicate solution 150 from at least some of the undissolved solids 160. In some embodiments, the reaction mixture separation system 146 employs a pressure differential greater than 50,000 pascals to separate the preliminary sodium silicate solution 150 from at least some of the undissolved solids 160. In some embodiments, the reaction mixture separation system 146 employs a pressure differential greater than 75,000 pascals to separate the preliminary sodium silicate solution 150 from at least some of the undissolved solids 160. In some embodiments, the reaction mixture separation system 146 employs a pressure differential greater than 100,000 pascals to separate the preliminary sodium silicate solution 150 from at least some of the undissolved solids 160. This pressure may be supplied by indirectly from the reaction chamber, as previously mentioned, or by an off-the-shelf pump.

In some embodiments, the post-reaction separation process 240 is conducted at a temperature that is less than or equal to 175° C. In some embodiments, the post-reaction separation process 240 is conducted at a temperature that is less than or equal to 160° C. In some embodiments, the post-reaction separation process 240 is conducted at a temperature that is less than or equal to 125° C. In some embodiments, the post-reaction separation process 240 is conducted at a temperature that is less than or equal to 110° C. In some embodiments, the post-reaction separation process 240 is conducted at a temperature that is less than or equal to 100° C. In some embodiments, the post-reaction separation process 240 is conducted at a temperature that is greater than or equal to 50° C. In some embodiments, the post-reaction separation process 240 is conducted at a temperature that is greater than or equal to 75° C. In some embodiments, the post-reaction separation process 240 is conducted at a temperature that is greater than or equal to 90° C. Temperatures higher than ambient temperature tend to decrease the viscosity of the post-reaction mixture and tend to facilitate separation of the solids from the liquid.

In some embodiments, the preliminary sodium silicate solution 150 may have a solid concentration that is less than 5%. In some embodiments, the preliminary sodium silicate solution 150 may have a solid concentration that is less than 10%. In some embodiments, the preliminary sodium silicate solution 150 may have a solid concentration that is less than 15%. In some embodiments, the preliminary sodium silicate solution 150 may have a solid concentration that is less than 20%. In some embodiments, the preliminary sodium silicate solution 150 may have a solid concentration that is less than 25%. In some embodiments, the preliminary sodium silicate solution 150 may have a solid concentration that is less than 30%. In some embodiments, the preliminary sodium silicate solution 150 may have a solid concentration that is greater than 5%. In some embodiments, the preliminary sodium silicate solution 150 may have a solid concentration that is greater than 10%. In some embodiments, the preliminary sodium silicate solution 150 may have a solid concentration that is greater than 15%. In some embodiments, the preliminary sodium silicate solution 150 may have a solid concentration that is greater than 20%. In some embodiments, the preliminary sodium silicate solution 150 may have a solid concentration that is greater than 25%. In some embodiments, the preliminary sodium silicate solution 150 may have a solid concentration that is greater than 30%.

In some embodiments, in a standardized sodium silicate solution that has approximately 37% solids by weight and that has a ratio by weight of silica to sodium oxide that is approximately 3.3, greater than or equal to 98% of the undissolved solids 160 are smaller than 10 microns. In some embodiments, in a standardized sodium silicate solution that has approximately 37% solids by weight and that has a ratio by weight of silica to sodium oxide that is approximately 3.3, greater than or equal to 99% of the undissolved solids 160 are smaller than 10 microns.

In some embodiments, in a standardized sodium silicate solution that has approximately 37% solids by weight and that has a ratio by weight of silica to sodium oxide that is approximately 3.3, greater than or equal to 98% of the undissolved solids 160 are smaller than 5 microns. In some embodiments, in a standardized sodium silicate solution that has approximately 37% solids by weight and that has a ratio by weight of silica to sodium oxide that is approximately 3.3, greater than or equal to 99% of the undissolved solids 160 are smaller than 5 microns.

In some embodiments, in a standardized sodium silicate solution that has approximately 37% solids by weight and that has a ratio by weight of silica to sodium oxide that is approximately 3.3, greater than or equal to 98% of the undissolved solids 160 are smaller than 2 microns. In some embodiments, in a standardized sodium silicate solution that has approximately 37% solids by weight and that has a ratio by weight of silica to sodium oxide that is approximately 3.3, greater than or equal to 99% of the undissolved solids 160 are smaller than 2 microns.

In some embodiments, in a standardized sodium silicate solution that has approximately 37% solids by weight and that has a ratio by weight of silica to sodium oxide that is approximately 3.3, greater than or equal to 98% of the undissolved solids 160 are smaller than 1 micron. In some embodiments, in a standardized sodium silicate solution that has approximately 37% solids by weight and that has a ratio by weight of silica to sodium oxide that is approximately 3.3, greater than or equal to 99% of the undissolved solids 160 are smaller than 1 micron.

In some embodiments, the preliminary sodium silicate solution 150 may have a percentage of undissolved solids 160 by weight that have a minimum dimension greater than or equal to 2 microns, wherein the percentage of such undissolved solids 160 is equivalent to less than or equal to 0.005% in a standardized sodium silicate solution that has approximately 37% solids by weight and that has a ratio by weight of silica to sodium oxide that is approximately 3.3. In some embodiments, the preliminary sodium silicate solution 150 may have a percentage of undissolved solids 160 by weight that have a minimum dimension greater than or equal to 2 microns, wherein the percentage of such undissolved solids 160 is equivalent to less than or equal to 0.001% in a standardized sodium silicate solution that has approximately 37% solids by weight and that has a ratio by weight of silica to sodium oxide that is approximately 3.3.

In some embodiments, the preliminary sodium silicate solution 150 may have a percentage of undissolved solids 160 by weight that have a minimum dimension greater than or equal to 1 micron, wherein the percentage of such undissolved solids 160 is equivalent to less than or equal to 0.005% in a standardized sodium silicate solution that has approximately 37% solids by weight and that has a ratio by weight of silica to sodium oxide that is approximately 3.3. In some embodiments, the preliminary sodium silicate solution 150 may have a percentage of undissolved solids 160 by weight that have a minimum dimension greater than or equal to 1 micron, wherein the percentage of such undissolved solids 160 is equivalent to less than or equal to 0.001% in a standardized sodium silicate solution that has approximately 37% solids by weight and that has a ratio by weight of silica to sodium oxide that is approximately 3.3.

In some embodiments, the preliminary sodium silicate solution 150 may have a percentage of undissolved solids 160 by weight that have a minimum dimension greater than 0.5 or equal to microns, wherein the percentage of such undissolved solids 160 is equivalent to less than or equal to 0.005% in a standardized sodium silicate solution that has approximately 37% solids by weight and that has a ratio by weight of silica to sodium oxide that is approximately 3.3. In some embodiments, the preliminary sodium silicate solution 150 may have a percentage of undissolved solids 160 by weight that have a minimum dimension greater than or equal to 0.5 microns, wherein the percentage of such undissolved solids 160 is equivalent to less than or equal to 0.001% in a standardized sodium silicate solution that has approximately 37% solids by weight and that has a ratio by weight of silica to sodium oxide that is approximately 3.3.

The preliminary sodium silicate solution 150 may be pumped, conveyed, or otherwise transported to, and stored in, the preliminary sodium silicate solution storage 330 (preliminary solution tank) until further processing is desired, or the preliminary sodium silicate solution 150 may be directed to system components for producing target lower-purity industrial-grade sodium silicate solutions 170 or purification system 186 (also referred to as organic separation system 186) for producing a high-purity sodium silicate solution 190 that is further processed through system components to yield target high-purity high-ratio sodium silicate concentrates **180*a* or target high-purity low-ratio sodium silicate concentrates 180*b* (generically, target high-purity solutions 180**).

In some embodiments, the contents of the preliminary sodium silicate solution storage 330 can be constantly stirred or otherwise constantly agitated. In some embodiments, the contents of the preliminary sodium silicate solution storage 330 can be continuously stirred or otherwise continuously agitated.

In some embodiments, the preliminary sodium silicate solution 150 in the preliminary sodium silicate solution storage 330 can be maintained at a temperature lower than or equal to the boiling point of the preliminary sodium silicate solution 150. In some embodiments, the preliminary sodium silicate solution 150 can be maintained at a temperature greater than or equal to 20° C. In some embodiments, the preliminary sodium silicate solution 150 can be maintained at a temperature greater than or equal to 30° C. In some embodiments, the preliminary sodium silicate solution 150 can be maintained at a temperature greater than or equal to 40° C. In some embodiments, the preliminary sodium silicate solution 150 can be maintained at a temperature greater than or equal to 50° C. In some embodiments, the preliminary sodium silicate solution 150 can be maintained at a temperature greater than or equal to 60° C. In some embodiments, the preliminary sodium silicate solution 150 can be maintained at a temperature greater than or equal to 75° C. In some embodiments, the preliminary sodium silicate solution 150 can be maintained at a temperature greater than or equal to 85° C. In some embodiments, the preliminary sodium silicate solution 150 can be maintained at a temperature greater than or equal to 90° C. In some embodiments, the preliminary sodium silicate solution 150 can be maintained at a temperature less than or equal to 150° C. In some embodiments, the preliminary sodium silicate solution 150 can be maintained at a temperature less than or equal to 125° C. In some embodiments, the preliminary sodium silicate solution 150 can be maintained at a temperature less than or equal to 100° C.

The preliminary sodium silicate solution 150 can be pumped, conveyed, or otherwise transported to an organic separation system 186 that performs a purification or separation process step 250 to separate soluble contaminants from the preliminary sodium silicate solution 150 to provide a high-purity sodium silicate solution 190.

In some embodiments, the organic separation system 186 employs a second post-reaction filter media. In some embodiments, the second post-reaction filter media employs activated carbon. In some embodiments, the second post-reaction filter media employs a carbon molecular sieve (CMS). In some embodiments, the second post-reaction filter media employs zeolite. In some embodiments, the organic separation system 186 employs a peroxide treatment. In some embodiments, the peroxide treatment is accompanied by a UV light treatment.

In some embodiments, the purification process 250 is conducted at a temperature that is less than or equal to 175° C. In some embodiments, the purification process 250 is conducted at a temperature that is less than or equal to 160° C. In some embodiments, the purification process 250 is conducted at a temperature that is less than or equal to 125° C. In some embodiments, the purification process 250 is conducted at a temperature that is less than or equal to 110° C. In some embodiments, the purification process 250 is conducted at a temperature that is less than or equal to 100° C. In some embodiments, the purification process 250 is conducted at a temperature that is less than or equal to 90° C. In some embodiments, the purification process 250 is conducted at a temperature that is less than or equal to 80° C. In some embodiments, the purification process 250 is conducted at a temperature that is greater than or equal to 35° C. In some embodiments, the purification process 250 is conducted at a temperature that is greater than or equal to 50° C. In some embodiments, the purification process 250 is conducted at a temperature that is greater than or equal to 65° C. In some embodiments, the purification process 250 is conducted at a temperature that is greater than or equal to 75° C. In some embodiments, the purification process 250 is conducted at a temperature that is greater than or equal to 90° C.

In some embodiments, the purification process 250 employs gravitational force to direct the preliminary sodium silicate solution 150 through the organic separation system 186 to provide the high-purity sodium silicate solution 190. In some embodiments, the purification process 250 employs a pressure differential greater than 20,000 pascals across the organic separation system 186. In some embodiments, the purification process 250 employs a pressure differential greater than 35,000 pascals across the organic separation system 186. In some embodiments, the purification process 250 employs a pressure differential greater than 50,000 pascals across the organic separation system 186. In some embodiments, the purification process 250 employs a pressure differential greater than 75,000 pascals across the organic separation system 186. In some embodiments, the purification process 250 employs a pressure differential greater than 100,000 pascals across the organic separation system 186. This pressure may be supplied by indirectly from the reaction chamber, as previously mentioned, or by an off-the-shelf pump.

In some embodiments, the organic separation system 186 removes at least some soluble lignin from the preliminary sodium silicate solution 150. In some embodiments, the organic separation system 186 removes at least some 5-hydroxymethylfurfural (HMF) from the preliminary sodium silicate solution 150.

In some embodiments, the high-purity sodium silicate solution 190 can be characterized with respect to a standardized sodium silicate solution that has approximately 37% solids by weight and that has a ratio R by weight of $SiO_2$ to $Na_2O$ that is approximately 3.3.

In some embodiments, the high-purity sodium silicate solution 190 has a total organic content that is equivalent to less than approximately 30 ppm in the standardized sodium silicate solution. In some embodiments, the high-purity sodium silicate solution 190 has a total organic content that is equivalent to less than approximately 20 ppm in the standardized sodium silicate solution. In some embodiments, the high-purity sodium silicate solution 190 has a total organic content that is equivalent to less than approximately 10 ppm in the standardized sodium silicate solution.

In some embodiments, the high-purity sodium silicate solution 190 has a nephelometric turbidity that is equivalent to less than 2 units in the standardized sodium silicate solution. In some embodiments, the high-purity sodium silicate solution 190 has a nephelometric turbidity that is equivalent to less than 1.5 units in the standardized sodium silicate solution.

In some embodiments, the high-purity sodium silicate solution 190 has a combined chloride ion and sulfate ion concentration that is equivalent to less than or equal to 250 ppm in a standardized sodium silicate solution that has approximately 37% solids by weight and that has a ratio R by weight of $SiO_2$ to $Na_2O$ that is approximately 3.3, and wherein the high-purity sodium silicate solution 190 has a total organic content that is equivalent to less than approximately 30 ppm in the standardized sodium silicate solution.

In some embodiments, the high-purity sodium silicate solution 190 has a combined chloride ion and sulfate ion concentration that is equivalent to less than or equal to 225 ppm in the standardized sodium silicate solution. In some embodiments, the high-purity sodium silicate solution 190 has a combined chloride ion and sulfate ion concentration that is equivalent to less than or equal to 200 ppm in the standardized sodium silicate solution. In some embodiments, the high-purity sodium silicate solution 190 has a combined chloride ion and sulfate ion concentration that is equivalent to less than or equal to 175 ppm in the standardized sodium silicate solution. In some embodiments, the high-purity sodium silicate solution 190 has a combined chloride ion and sulfate ion concentration that is equivalent to less than or equal to 150 ppm in the standardized sodium silicate solution. In some embodiments, the high purity sodium silicate solution 190 has a combined chloride ion and sulfate ion concentration that is equivalent to less than or equal to 100 ppm in the standardized sodium silicate solution.

In some embodiments, the high-purity sodium silicate solution 190 has a chloride ion concentration that is equivalent to less than 100 ppm in the standardized sodium silicate solution. In some embodiments, the high-purity sodium silicate solution 190 has a chloride ion concentration that is equivalent to less than 75 ppm in the standardized sodium silicate solution. In some embodiments, the high-purity sodium silicate solution 190 has a chloride ion concentration that is equivalent to less than 60 ppm in the standardized sodium silicate solution. In some embodiments, the high-purity sodium silicate solution 190 has a chloride ion concentration that is equivalent less than 40 ppm in the standardized sodium silicate solution. In some embodiments, the high-purity sodium silicate solution 190 has a chloride ion concentration that is equivalent to less than 25 ppm in the standardized sodium silicate solution.

In some embodiments, the high-purity sodium silicate solution 190 has a sulfate ion concentration that is equivalent to less than 100 ppm in the standardized sodium silicate solution. In some embodiments, the high-purity sodium silicate solution 190 has a sulfate ion concentration that is equivalent to less than 75 ppm in the standardized sodium silicate solution. In some embodiments, the high-purity sodium silicate solution 190 has a sulfate ion concentration that is equivalent to less than 50 ppm in the standardized sodium silicate solution. In some embodiments, the high-purity sodium silicate solution 190 has a sulfate ion concentration that is equivalent to less than 25 ppm in the standardized sodium silicate solution. In some embodiments, the high-purity sodium silicate solution 190 has a sulfate ion concentration that is equivalent to less than 10 ppm in the standardized sodium silicate solution.

In some embodiments, the high-purity sodium silicate solution 190 has a calcium concentration that is equivalent to less than 25 ppm in the standardized sodium silicate solution. In some embodiments, the high-purity sodium silicate solution 190 has a calcium concentration that is equivalent to less than 15 ppm in the standardized sodium silicate solution. In some embodiments, the high-purity sodium silicate solution 190 has a calcium concentration that is equivalent to less than 10 ppm in the standardized sodium silicate solution.

In some embodiments, the high-purity sodium silicate solution 190 has a magnesium concentration that is equivalent to less than 10 ppm in the standardized sodium silicate solution. In some embodiments, the high-purity sodium silicate solution 190 has a magnesium concentration that is equivalent to less than or equal to 5 ppm in the standardized sodium silicate solution.

In some embodiments, the high-purity sodium silicate solution 190 has an aluminum concentration that is equivalent to less than or equal to 50 ppm in the standardized sodium silicate solution. In some embodiments, the high-purity sodium silicate solution 190 has an aluminum concentration that is equivalent to less than or equal to 40 ppm in the standardized sodium silicate solution. In some embodiments, the high-purity sodium silicate solution 190 has an aluminum concentration that is equivalent to less than or equal to 25 ppm in the standardized sodium silicate solution.

In some embodiments, the high-purity sodium silicate solution 190 has an iron concentration that is equivalent to less than or equal to 25 ppm in the standardized sodium silicate solution. In some embodiments, the high-purity sodium silicate solution 190 has an iron concentration that is equivalent to less than or equal to 15 ppm in the standardized sodium silicate solution.

Another high-purity solution parameter can be color as measured by any method. In one embodiment, light absorbance at a wavelength range from yellow to orange would be measured, such as by a spectrophotometer. The purity level could be determined by absorbance values below pre-determined designated absorbance values. Alternatively, a glass beaker can be filled with the silicate solution and placed in front of a white background and optically compared to the appearance of similar beaker is filled with clean water and placed next to it.

The high-purity sodium silicate solution 190 may be pumped, conveyed, or otherwise transported to, and stored in, the high-purity solution storage 350 until further processing is desired, or the high-purity sodium silicate solution 190 may be directed to system components for reclaiming water and adjusting the concentration of the target high-purity sodium silicate solutions 180. In some embodiments, the contents of the high-purity solution storage 350 can be constantly stirred or otherwise constantly agitated. In some embodiments, the contents of the high-purity solution storage 350 can be continuously stirred or otherwise continuously agitated.

In some embodiments, the high-purity sodium silicate solution 190 in the high-purity solution storage 350 can be maintained at a temperature lower than or equal to the boiling point of the high-purity sodium silicate solution 190. In some embodiments, the high-purity sodium silicate solution 190 can be maintained at a temperature greater than or equal to 50° C. In some embodiments, the high-purity sodium silicate solution 190 can be maintained at a temperature greater than or equal to 60° C. In some embodiments, the high-purity sodium silicate solution 190 can be maintained at a temperature greater than or equal to 75° C. In some embodiments, the high-purity sodium silicate solution 190 can be maintained at a temperature greater than or equal to 85° C. In some embodiments, the high-purity sodium silicate solution 190 can be maintained at a temperature greater than or equal to 90° C. In some embodiments, the high-purity sodium silicate solution 190 can be maintained at a temperature less than or equal to 150° C. In some embodiments, the high-purity sodium silicate solution 190 can be maintained at a temperature less than or equal to 125° C. In some embodiments, the high-purity sodium silicate solution 190 can be maintained at a temperature less than or equal to 100° C.

The high-purity sodium silicate solution 190 can be pumped to a ratio adjustment system 184, which facilitates adjustment of the ratio R of $SiO_2$:$Na_2O$ by weight of the high-purity sodium silicate solution 190.

The ratio adjustment system 184 can be used in conjunction with the production of both target lower-purity industrial grade solutions 170 and target high-purity grade solutions 180 destined for high-ratio storage 380*a* and/or low-ratio storage 380*b*. In some embodiments, the contents of the product solution storages 380 can be constantly stirred or otherwise constantly agitated. In some embodiments, the contents of the product solution storages 380 can be continuously stirred or otherwise continuously agitated.

With reference to FIG. 3B, separate ratio adjustment systems 184*a* and 184*b* can be employed in conjunction with the respective grades. Depending on the particular system components, one might want to avoid a higher-purity stream being exposed to contaminants in a potentially lower-purity industrial-grade stream.

The ratio adjustment system 184 may receive sodium hydroxide from the same sodium hydroxide source 142 that feeds the reactor 140 or from a different source. For example, if in solution, the sodium hydroxide fed to the ratio adjustment system 184 may be in the same concentration or grade as that fed to the reactor 140, or the concentration or grade may be different. Typically, sodium hydroxide can be obtained in diaphragm grade, membrane grade, or semiconductor grade. The grade can be selected for the reaction or for final concentration adjustment in accordance with the desired purity of the final product.

The concentration and amount of sodium hydroxide fed to the ratio adjustment system 184 can be calculated so as to produce industrial and high-purity grades at the desired ratio R of $SiO_2$:$Na_2O$ by weight at the desired percentage of solids by weight upon evaporation of excess water by a concentration system 182. In some embodiments, enough sodium hydroxide is measured to provide the desired ratio R, and then water is added to create a 2 molar concentration of sodium hydroxide in water to be added to the ratio adjustment system 184. One will note that the sodium hydroxide and the water can be added to the ratio adjustment system 184 separately. One will also note that the sodium hydroxide can be added in the form of a hydrate, such as the monohydrate ($NaOH \cdot H_2O$).

In some embodiments, the high-purity sodium silicate solution 190 in the ratio adjustment system 184 can be maintained at a temperature lower than or equal to the boiling point of the high-purity sodium silicate solution 190. In some embodiments, the temperature can be maintained at greater than or equal to 50° C. In some embodiments, the temperature can be maintained at greater than or equal to 60° C. In some embodiments, the temperature can be maintained at greater than or equal to 75° C. In some embodiments, the temperature can be maintained at greater than or equal to 85° C. In some embodiments, the temperature can be maintained at greater than or equal to 90° C. In some embodiments, the temperature can be maintained at less than or equal to 150° C. In some embodiments, the temperature can be maintained at less than or equal to 125° C. In some embodiments, the temperature can be maintained at less than or equal to 100° C.

In some embodiments, the high-purity solution storage 350 may serve as an evaporator to reduce the water content of the high-purity sodium silicate solution 190. Alternatively, the high-purity sodium silicate solution 190 can be conveyed from the high-purity solution storage 350 to the concentration system 182 (also referred to as an evaporator system 182), which may be used to adjust the percentage of solids by weight. The concentration system 182 can be used in conjunction with the production of both the target lower-purity industrial grade solutions 170 and the target high-purity solutions 180, or separate evaporator systems 182*a* and 182*b* can be employed in conjunction with the respective grades, such as shown in FIG. 3B in connection with alternative embodiments.

The concentration system 182 can be a simple distillation system, boiler, continuous evaporator system, negative pressure evaporator, vacuum pump, falling film, thin film, or other type concentration system 182.

In some embodiments, the concentration system 182 reduces the volume of the high-purity sodium silicate solution 190 by greater than or equal to 10%. In some embodiments, the concentration system 182 reduces the volume of the high-purity sodium silicate solution 190 by greater than or equal to 15%. In some embodiments, the concentration system 182 reduces the volume of the high-purity sodium silicate solution 190 by greater than or equal to 20%. In some embodiments, the concentration system 182 reduces the volume of the high-purity sodium silicate solution 190 by greater than or equal to 25%. In some embodiments, the concentration system 182 reduces the volume of the high-purity sodium silicate solution 190 by greater than or equal to 30%. In some embodiments, the concentration system 182 reduces the volume of the high-purity sodium silicate solution 190 by greater than or equal to 33%. In some embodiments, the concentration system 182 reduces the volume of the high-purity sodium silicate solution 190 by greater than or equal to 35%.

In some embodiments, pre-industrial grade solution is heated to evaporate water to obtain a concentration of 30 to 50% of sodium silicate by dry content weight. In some embodiments, pre-industrial grade solution is heated to evaporate water to obtain a concentration of 10 to 30% of sodium silicate by dry content weight.

In some embodiments, the high-purity sodium silicate solution 190 is heated to evaporate water to obtain a concentration of 30 to 50% of sodium silicate by dry content weight. In some embodiments, the high-purity sodium silicate solution 190 is heated to evaporate water to obtain a concentration of 10 to 30% of sodium silicate by dry content weight.

One will appreciate that the order of ratio adjustment and concentration adjustment may be reversed, such as shown in FIGS. 1B and 3B. One advantage for employing the ratio adjustment system 184 first is that an already concentrated high-purity sodium silicate solution 190 would utilize far less sodium hydroxide to bring it to the desired target solution ratio.

In some embodiments, the concentration system 182 may include aspects of the ratio adjustment system for gross ratio adjustment and/or for incremental ratio adjustment. For example, the container for evaporation may be equipped with a nozzle or other port or inlet for taking samples and/or a nozzle or other port or inlet for adding the sodium hydroxide.

The water removed by the concentration system 182 can be directed to the water purification system 314 if further purification is desired before the water is re-used, or, in many cases the water can be directly routed to the ash rinse system 124.

In some embodiments, the concentration system 182 may function as a final separation or purification system. Alternatively, the concentrated and/or ratio adjusted high-purity sodium silicate solution 190 may be directed to a final separation or purification system 360 for final filtering. In some embodiments, the final separation or purification system 360 can be used to filter out particles that are greater than 0.05 microns. In some embodiments, the final separation or purification system 360 can be used to filter out particles that are between 0.05 microns and 5 microns. In some embodiments, the final separation or purification system 360 can be used to filter out particles that are greater than 0.1 microns. In some embodiments, the final separation or purification system 360 can be used to filter out particles that are between 0.1 microns and 1 micron.

With reference to FIG. 1B and FIG. 3B, in some embodiments, industrial grade solutions 170 need not undergo organic separation or any of the purification in the process step 250, so separate equipment may be provided for low-purity grade streams and high-purity grade streams. Moreover, depending on the particular system components, one might want to avoid the high-purity stream being exposed to contaminants in the low-purity stream.

To provide low-grade industrial grade solutions 170, the preliminary sodium silicate solution 150 can be pumped, conveyed, or otherwise transported to an evaporation system 182 to reduce the water content of the preliminary sodium silicate solution 150 to provide a pre-industrial grade solution.

After the amount of water is reduced, the pre-industrial grade solution can be pumped to a concentration and ratio adjustment system 184, which facilitates adjustment of the ratio R of $SiO_2$:$Na_2O$ by weight in the solution as well as adjustment of the percentage of solids by weight to provide the industrial grade solution 170 at the desired ratio R and the desired percentage of solids. One will appreciate that the order of ratio adjustment and concentration adjustment may be reversed, such as shown in FIG. 3B.

To provide high-purity sodium silicate solutions 190, the preliminary sodium silicate solution 150 can be pumped, conveyed, or otherwise transported to an organic separation system 186 that performs a purification or separation process step 250 to separate soluble contaminants from the preliminary sodium silicate solution 150.

The evaporation system 182*b* can be identical to the evaporation system 182*a*, or they can utilize different equipment, volumes, temperature ranges, pressures, and/or process time per volume.

After the amount of water is reduced, the high-purity sodium silicate solution 190 can be pumped to the ratio adjustment system 184, which facilitates adjustment of the ratio R of $SiO_2$:$Na_2O$ by weight in the solution.

The ratio adjustment system 184 can be used in conjunction with the production of both the lower-purity industrial grade solutions 170 and the target high-purity solutions 180, or separate concentration and ratio adjustment systems 184*a* and 184*b* can be employed in conjunction with the respective grades. Depending on the particular system components, one might want to avoid the high-purity stream being exposed to contaminants in the industrial grade stream. The ratio adjustment system 184*b* can be identical to the ratio adjustment system 184*a*, or they can utilize different equipment, volumes, temperature ranges, pressures, and/or process time per volume. As previously noted, one will appreciate that the order of ratio adjustment and concentration adjustment may be reversed, such as shown in FIGS. 1B and 3B.

In some embodiments, the target high-purity sodium silicate solution 180 can be characterized with respect to a standardized sodium silicate solution that has approximately 37% solids by weight and that has a ratio R by weight of $SiO_2$ to $Na_2O$ that is approximately 3.3.

In some embodiments, the target high-purity sodium silicate solution 180 has a total organic content that is equivalent to less than approximately 30 ppm in the standardized sodium silicate solution. In some embodiments, the target high-purity sodium silicate solution 180 has a total organic content that is equivalent to less than approximately 20 ppm in the standardized sodium silicate solution. In some embodiments, the target high-purity sodium silicate solution 180 has a total organic content that is equivalent to less than approximately 10 ppm in the standardized sodium silicate solution.

In some embodiments, the target high-purity sodium silicate solution 180 has a nephelometric turbidity that is equivalent to less than 2 units in the standardized sodium silicate solution. In some embodiments, the target high-purity sodium silicate solution 180 has a nephelometric turbidity that is equivalent to less than 1.5 units in the standardized sodium silicate solution.

In some embodiments, the target high-purity sodium silicate solution 180 has a ratio R of $SiO_2$:$Na_2O$ by weight that is greater than or equal to 1.8, wherein the target high-purity sodium silicate solution 180 has a combined chloride ion and sulfate ion concentration that is equivalent to less than or equal to 250 ppm in a standardized sodium silicate solution that has approximately 37% solids by weight and that has a ratio R by weight of $SiO_2$ to $Na_2O$ that is approximately 3.3, and wherein the target high-purity sodium silicate solution 180 has a total organic content that is equivalent to less than approximately 30 ppm in the standardized sodium silicate solution.

In some embodiments, the target high-purity sodium silicate solution 180 has a combined chloride ion and sulfate ion concentration that is equivalent to less than or equal to 225 ppm in the standardized sodium silicate solution. In some embodiments, the target high-purity sodium silicate solution 180 has a combined chloride ion and sulfate ion concentration that is equivalent to less than or equal to 200 ppm in the standardized sodium silicate solution. In some embodiments, the target high-purity sodium silicate solution 180 has a combined chloride ion and sulfate ion concentration that is equivalent to less than or equal to 175 ppm in the standardized sodium silicate solution. In some embodiments, the target high-purity sodium silicate solution 180 has a combined chloride ion and sulfate ion concentration that is equivalent to less than or equal to 150 ppm in the standardized sodium silicate solution. In some embodiments, the target high purity sodium silicate solution 180 has a combined chloride ion and sulfate ion concentration that is equivalent to less than or equal to 100 ppm in the standardized sodium silicate solution.

In some embodiments, the target high-purity sodium silicate solution 180 can be characterized as having purity values as good as or better than the purity values that are previously listed for the high-purity sodium silicate solutions 190.

In some embodiments, the target high-purity sodium silicate solution 180 can exhibit a yield of silicate that is greater than or equal to 75% of the amorphous silica in the ash 122. In some embodiments, the target high-purity sodium silicate solution 180 can exhibit a yield of silicate that is greater than or equal to 80% of the amorphous silica in the ash 122. In some embodiments, the target high-purity sodium silicate solution 180 can exhibit a yield of silicate that is greater than or equal to 82% of the amorphous silica in the ash 122. In some embodiments, the target high-purity sodium silicate solution 180 can exhibit a yield of silicate that is greater than or equal to 85% of the amorphous silica in the ash 122. In some embodiments, the target high-purity sodium silicate solution 180 can exhibit a yield of silicate that is greater than or equal to 90% of the amorphous silica in the ash 122.

In some embodiments, high-ratio product storage **380*a* may be used to store target high-purity sodium silicate solutions 180 having ratios R that are greater than or equal to 3.3. In some embodiments, high-ratio product storage 380*a* may be used to store target high-purity sodium silicate solutions 180 having ratios R that are greater than or equal to 3.5. In some embodiments, high-ratio product storage 380*a* may be used to store target high-purity sodium silicate solutions 180 having ratios R that are greater than or equal to 3.7. In some embodiments, high-ratio product storage 380*a* may be used to store target high-purity sodium silicate solutions 180 having ratios R that are less than or equal to 3.7. In some embodiments, high-ratio product storage 380*a* may be used to store target high-purity sodium silicate solutions 180** having ratios R that are less than or equal to 3.5.

In some embodiments, lower-ratio product storage **380*b* may be used to store target high-purity sodium silicate solutions 180 having ratios R that are less than or equal to 3.3. In some embodiments, lower-ratio product storage 380*b* may be used to store target high-purity sodium silicate solutions 180 having ratios R that are less than or equal to 2.2. In some embodiments, lower-ratio product storage 380*b* may be used to store target high-purity sodium silicate solutions 180** having ratios R that are less than or equal to 2.0.

In some embodiments, high-ratio product storage **380*a* and low-ratio product storage 380*b* may be used to store target high-purity sodium silicate solutions 180 having concentrations that are greater than or equal to 25%. In some embodiments, high-ratio product storage 380*a* and low-ratio product storage 380*b* may be used to store target high-purity sodium silicate solutions 180 having concentrations that are greater than or equal to 30%. In some embodiments, high-ratio product storage 380*a* and low-ratio product storage 380*b* may be used to store target high-purity sodium silicate solutions 180 having concentrations that are greater than or equal to 35%. In some embodiments, high-ratio product storage 380*a* and low-ratio product storage 380*b* may be used to store target high-purity sodium silicate solutions 180** having concentrations that are greater than or equal to 37%.

Some customers may prefer target high-purity high-ratio sodium silicate solutions 180 to obtain the most silicate per volume to potentially reduce cost of material and shipping costs. Other customers may prefer target high-purity sodium silicate solutions 180 to have concentrations (and perhaps purities) that are specified to be consistent with sodium silicate solutions used in existing processes. For example, some industrial uses for structural materials, adhesives, binders, catalysts, ceramics, concrete, corrosion-resistant coatings, detergents, drilling fluids, industrial cleaners, paints, personal care products, and waste treatment, and water treatment may be satisfied with or prefer target high-purity low-ratio sodium silicate solutions **180*b*. However, some industrial uses for microelectronics, components in the food and pharmaceutical industries, catalysts, and personal care products may prefer target high-purity high-ratio sodium silicate solutions 180*a***.

The foregoing is illustrative of embodiments of the invention and is not to be construed as limiting thereof. Although a few specific example embodiments have been described, those skilled in the art will readily appreciate that many modifications to the disclosed exemplary embodiments, as well as other embodiments, are possible without materially departing from the novel teachings and advantages of the invention.

Accordingly, all such modifications are intended to be included within the scope of the invention as defined in the claims. For example, skilled persons will appreciate that the subject matter of any sentence or paragraph can be combined with subject matter of some or all of the other sentences or paragraphs, except where such combinations are mutually exclusive.

It will be obvious to those having skill in the art that many changes may be made to the details of the above-described embodiments without departing from the underlying principles of the invention. The scope of the present invention should, therefore, be determined by the following claims, with equivalents of the claims to be included therein.

The invention claimed is:

1. A target sodium silicate solution, comprising:

sodium silicate converted from biogenic silica in an amorphous state with sodium hydroxide, wherein the biogenic silica is from rinsed ash of burned organic matter; and water, wherein the target sodium silicate solution has a ratio R of $SiO_2$:$Na_2O$ by weight that is greater than or equal to 1.8, wherein the target sodium silicate solution has lower equivalent concentrations of contaminants and/or impurities when compared to a standardized sodium silicate solution, the lower equivalent concentrations of contaminants and/or impurities in the target sodium silicate solution including a combined chloride ion and sulfate ion concentration that is an equivalent concentration to less than or equal to 250 ppm and a total organic content that is an equivalent concentration to less than approximately 30 ppm in the standardized sodium silicate solution;

wherein the standardized sodium silicate solution has approximately 37% solids by weight and has a ratio R by weight of $SiO_2$ to $Na_2O$ that is approximately 3.3; and wherein the rinsed ash of burned organic matter has been rinsed with clean water and separated from contaminated rinse water, the contaminated rinse water containing chlorides, sulfates, and other water soluble contaminants.

2. The target sodium silicate solution of claim 1, wherein the combined chloride ion and sulfate ion concentration in the target sodium silicate solution is an equivalent concentration to less than or equal to 100 ppm in the standardized sodium silicate solution.

3. The target sodium silicate solution of claim 1, wherein the target sodium silicate solution has 10 to 50% of sodium silicate by dry content weight.

4. The target sodium silicate solution of claim 1, wherein the target sodium silicate solution has 35 to 50% of sodium silicate by dry content weight.

5. The target sodium silicate solution of claim 1, wherein the biogenic silica is from ash of burned rice hulls.

6. The target sodium silicate solution of claim 1, wherein the target sodium silicate solution is produced from rice hull ash, and wherein the silica is maintained below a temperature of 200° C.

7. The target sodium silicate solution of claim 1, wherein the target sodium silicate solution is produced from rice hull ash, and wherein the amorphous silica is converted to silicate at or below 160° C.

8. The target sodium silicate solution of claim 1, wherein the target sodium silicate solution has a ratio R of $SiO_2$:$Na_2O$ by weight that is greater than or equal to 3.22.

9. The target sodium silicate solution of claim 1, wherein the target sodium silicate solution has a ratio R of $SiO_2$:$Na_2O$ by weight that is greater than or equal to 3.75.

10. The target sodium silicate solution of claim 1, wherein the equivalent concentrations of contaminants and/or impurities in the target sodium silicate solution include a percentage of undissolved solids by weight that have a minimum dimension greater than 2 microns, wherein the percentage of such undissolved solids is an equivalent concentration to less than or equal to 0.001% in the standardized sodium silicate solution.

11. The target sodium silicate solution of claim 1, wherein the equivalent concentrations of contaminants and/or impurities in the target sodium silicate solution include a chloride ion concentration that is an equivalent concentration to less than 100 ppm in the standardized sodium silicate solution.

12. The target sodium silicate solution of claim 1, wherein the equivalent concentrations of contaminants and/or impurities in the target sodium silicate solution include a sulfate ion concentration that is an equivalent concentration to less than 100 ppm in the standardized sodium silicate solution.

13. The target sodium silicate solution of claim 1, wherein the equivalent concentrations of contaminants and/or impurities in the target sodium silicate solution include a calcium concentration that is an equivalent concentration to less than 25 ppm in the standardized sodium silicate solution.

14. The target sodium silicate solution of claim 1, wherein the equivalent concentrations of contaminants and/or impurities in the target sodium silicate solution include a magnesium concentration that is an equivalent concentration to less than 10 ppm in the standardized sodium silicate solution.

15. The target sodium silicate solution of claim 1, wherein the equivalent concentrations of contaminants and/or impurities in the target sodium silicate solution include an aluminum concentration that is an equivalent concentration to less than or equal to 50 ppm in the standardized sodium silicate solution.

16. The target sodium silicate solution of claim 1, wherein the equivalent concentrations of contaminants and/or impurities in the target sodium silicate solution includes an iron concentration that is an equivalent concentration to less than or equal to 25 ppm in the standardized sodium silicate solution.

17. The target sodium silicate solution of claim 1, wherein the target sodium silicate solution has a nephelometric turbidity that is equivalent to less than 2 units in the standardized sodium silicate solution.

18. The target sodium silicate solution of claim 1, wherein the equivalent concentrations of contaminants and/or impurities in the target sodium silicate solution include a total organic content that is an equivalent concentration to less than approximately 20 ppm in the standardized sodium silicate solution.

19. The target sodium silicate solution of claim 1, wherein the equivalent concentrations of contaminants and/or impurities in the target sodium silicate solution include equivalent concentrations of less than or equal to: 100 ppm chloride ion, 50 ppm calcium, 50 ppm sulfate ion, 75 ppm aluminum, 50 ppm iron, and 10 ppm titanium in the standardized sodium silicate solution, wherein the target sodium silicate solution has concentrations equivalent to the standardized solution having a nephelometric turbidity that is less than 2.

20. The target sodium silicate solution of claim 1, wherein the equivalent concentrations of contaminants and/or impurities in the target sodium silicate solution include a percentage of undissolved solids by weight that have a minimum dimension greater than 2 microns, wherein the percentage of such undissolved solids is an equivalent concentration to less than or equal to 0.001% in the standardized sodium silicate solution, wherein the equivalent concentrations of contaminants and/or impurities in the target sodium silicate solution include a chloride ion concentration that is an equivalent concentration to less than 100 ppm in the standardized sodium silicate solution, wherein the equivalent concentrations of contaminants and/or impurities in the target sodium silicate solution include a sulfate ion concentration that is an equivalent concentration to less than 100 ppm in the standardized sodium silicate solution, wherein the equivalent concentrations of contaminants and/or impurities in the target sodium silicate solution include a calcium concentration that is an equivalent concentration to less than 25 ppm in the standardized sodium silicate solution, wherein the equivalent concentrations of contaminants and/or impurities in the target sodium silicate solution include a magnesium concentration that is an equivalent concentration to less than 10 ppm in the standardized sodium silicate solution, wherein the equivalent concentrations of contaminants and/or impurities in the target sodium silicate solution include an aluminum concentration that is an equivalent concentration to less than or equal to 50 ppm in the standardized sodium silicate solution, wherein the equivalent concentrations of contaminants and/or impurities in the target sodium silicate solution include an iron concentration that is an equivalent concentration to less than or equal to 25 ppm in the standardized sodium silicate solution, wherein the target sodium silicate solution has a nephelometric turbidity that is equivalent to less than 2 units in the standardized sodium silicate solution, and wherein the equivalent concentrations of contaminants and/or impurities in the target sodium silicate solution include a total organic content that is an equivalent concentration to less than approximately 20 ppm in the standardized sodium silicate solution.

* * * * *